United States Patent [19]
Gilai et al.

[11] Patent Number: 6,018,736
[45] Date of Patent: Jan. 25, 2000

[54] WORD-CONTAINING DATABASE ACCESSING SYSTEM FOR RESPONDING TO AMBIGUOUS QUERIES, INCLUDING A DICTIONARY OF DATABASE WORDS, A DICTIONARY SEARCHER AND A DATABASE SEARCHER

[75] Inventors: Atzmon Gilai, Holon; Hezi Resnekov, Ra'anana, both of Israel

[73] Assignee: Phonetic Systems Ltd., Holon, Israel

[21] Appl. No.: 08/749,374

[22] Filed: Nov. 20, 1996

Related U.S. Application Data

[63] Continuation of application No. 08/317,040, Oct. 3, 1994, abandoned.

[51] Int. Cl.[7] .................................................. G06F 17/20
[52] U.S. Cl. .................................... 707/6; 707/5; 704/239; 704/240; 704/251
[58] Field of Search .................................. 707/5, 6, 532, 707/533; 704/239, 240, 251; 379/89

[56] References Cited

U.S. PATENT DOCUMENTS

| | | | |
|---|---|---|---|
| 5,131,045 | 7/1992 | Roth | 704/237 |
| 5,218,536 | 6/1993 | McWherter | 707/533 |
| 5,333,317 | 7/1994 | Dann | 707/5 |
| 5,457,770 | 10/1995 | Miyazawa | 704/255 |
| 5,479,489 | 12/1995 | O'Brien | 379/67 |
| 5,621,857 | 4/1997 | Cole et al. | 704/232 |
| 5,623,578 | 4/1997 | Mikkilineni | 704/255 |
| 5,638,425 | 6/1997 | Meador, III et al. | 379/88 |

*Primary Examiner*—Jean R. Homere
*Attorney, Agent, or Firm*—David L. Davis

[57] ABSTRACT

A database accessing system for processing a request to access a database including a multiplicity of entries, each entry including at least one word, the request including a sequence of representations of possibly erroneous user inputs, the system including a similar word finder operative, for at least one interpretation of each representation, to find at least one database word which is at least similar to that interpretation, and a database entry evaluator operative, for each database word found by the similar word finder, to assign similarity values for relevant entries in the database, said values representing the degree of similarity between each database entry and the request.

16 Claims, 12 Drawing Sheets

Microfiche Appendix Included
(8 Microfiche, 782 Pages)

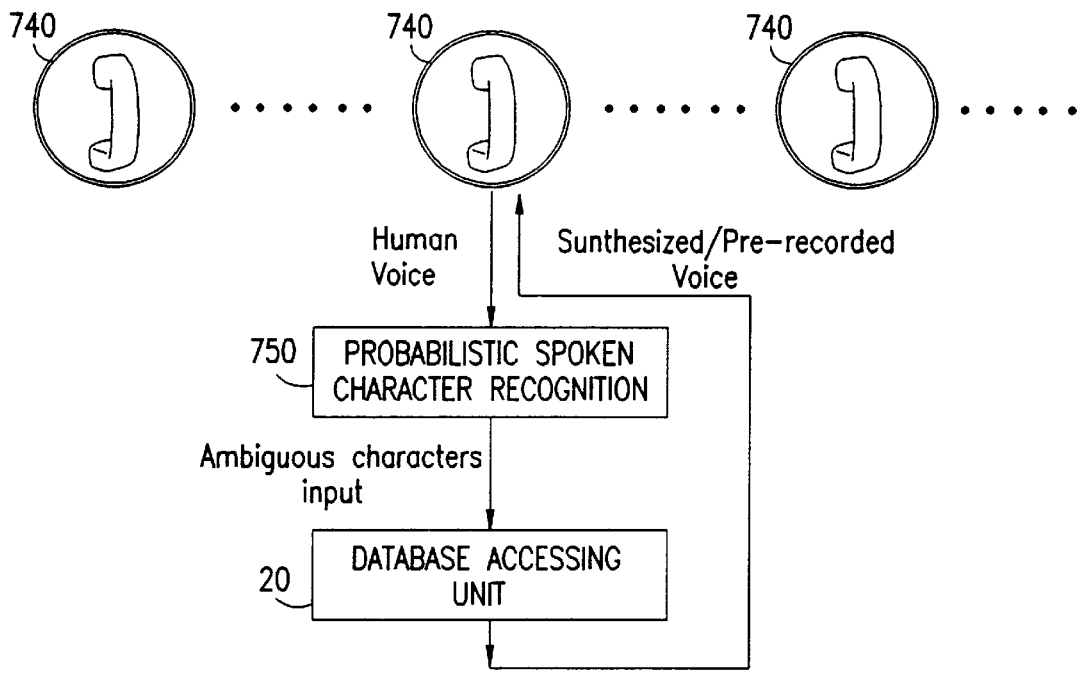
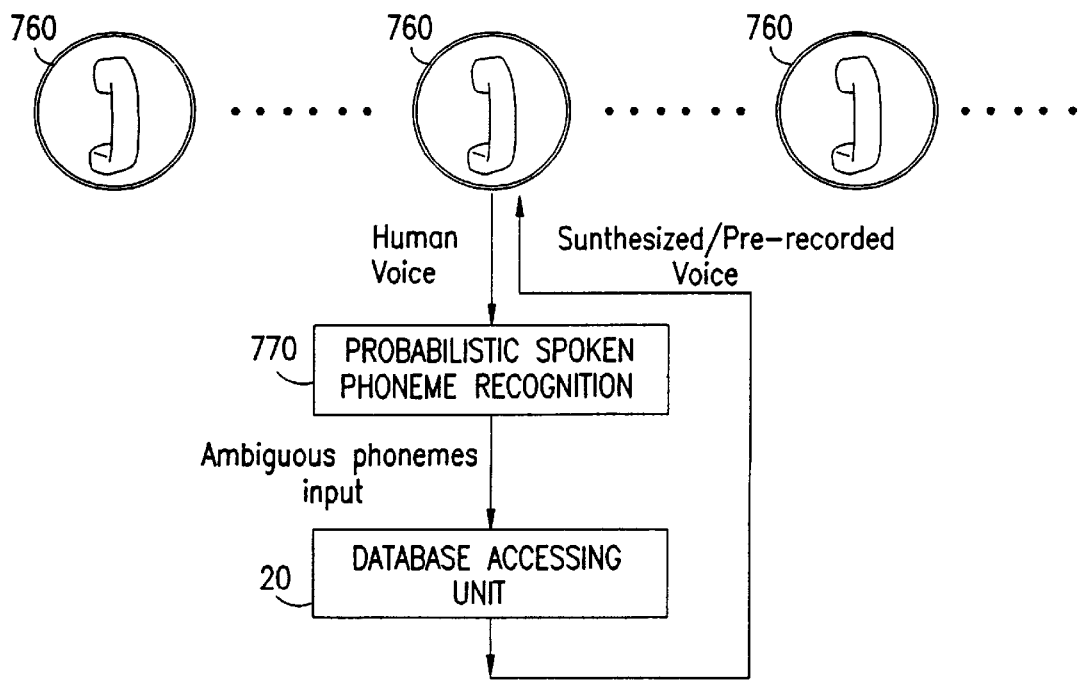

WORD-CONTAINING DATABASE ACCESSING SYSTEM FOR RESPONDING TO AMBIGUOUS QUERIES, INCLUDING A DICTIONARY OF DATABASE WORDS, A DICTIONARY SEARCHER AND A DATABASE SEARCHER

This application is a continuation of application Ser. No. 08/317,040, filed Oct. 3, 1994, abandoned.

A portion of the disclosure of this patent document contains material which is subject to {copyright or mask work} protection. The {copyright or mask work} owner has no objection to the facsimile reproduction by anyone of the patent document or the patent disclosure, as it appears in the Patent and Trademark Office patent file or records, but otherwise reserves all {copyright or mask work} rights whatsoever.

MICROFICHE APPENDIX

This application contains a microfiche appendix consisting of 8 microfiche and 782 frames.

FIELD OF THE INVENTION

The present invention relates to methods and apparatus for accessing databases generally and for accessing databases via the telephone, in particular.

BACKGROUND OF THE INVENTION

Publications describing conventional methods and systems for accessing databases via the telephone and publications on subjects related to these technologies, such as speech recognition publications, include the following:

U.S. Pat. No. 4,608,460 to Carter, entitled "Comprehensive Automatic Directory Assistance Apparatus and Method Thereof;

WO Patent No. 88/02965 to Daudelin, entitled "Directory Assistance Call Processing and non-Supervisory Signal Monitoring Arrangements";

U.S. Pat. No. 4,650,927 to James, entitled "Processor Assisted Communication System using Tone-Generating Telephones";

U.S. Pat. No. 5,255,310, to Kim, entitled "Method of Approximately Matching an Input Character String with a Key Word and Vocally Outputting Data";

U.S. Pat. No. 4,674,112 to Kondraske, entitled "Character pattern Recognition and Communications Apparatus";

U.S. Pat. No. 5,214,689 to O'Sullivan, entitled "Interactive Transit Information System";

WO Patent No. 89/00793 to Padden, entitled "Directory Assistance Systems";

U.S. Pat. No. 4,979,206 to Padden, entitled "Directory Assistance Systems";

U.S. Pat. No. 5,131,045 to Roth, entitled "Audio-Augmented Data Keying";

U.S. Pat. No. 5,052,038 to Shepard, entitled "Apparatus and Method for Obtaining information in a Wide-Area Telephone System with Digital Data Transmission Between a Local Exchange and an Information Storage Site";

U.S. Pat. No. 3,928,724 to Byram, entitled "Voice-Actuated Telephone Directory-Assistance System";

Church K. W., *Phonological Parsina in Speech Recognition*, Kluwer Academic Publ, 1987;

Colangelo R. D., "Directory Assistance for the Visually Impaired", SouthEastcon 89, Vol 3, pp. 1168–1171, 1989;

Fast L., Ballantine R., "Dialing a Name: Alphabetic Entry Through a Telephone Keypad", SIGCHI, Vol 20(2) pp. 34, 1988;

Glowacz D., "RBOCs Vocalize Operator Services", Telephone Engineer & Management, Vol 95(7) pp. 25–30, 1991;

Holmgren J. E., "Toward bell System Applications of Automatic Speech Recognition", The Bell System Technical Journal, Vol 62(6) pp. 1865–1881, 1983;

Jack M. A., "Design and Evaluation of Automated Telephone Services", IEE Colloquium on Telecommunications, pp. 61–64, 1992;

Klatt D. H., "Review of Text-to-Speech Conversion for English", Journal of the Acoustical Society of America, Vol 82(3) pp. 737–793, 1987;

Lennig M., "Putting Speech Recognition to Work in the Telephone Network", Computer, Vol 23(8) pp. 35–41, 1990;

Myers C. S., Rabiner L. R., "An Automated Directory Listing Retrieval System based on Recognition of Connected Letter Strings", Journal of the Acoustical Society of America, Vol 71(3), pp. 716–727, 1982;

Ohyama Minoru, "A Knowledge-Based Directory Assistance System", Future Generation Computer Systems, Vol 5(1) pp. 109–117, 1989;

Pelton G. E., "Designing the Telephone Interface for Voice Processing Applications", Speech Technology, Vol 5(1) pp. 18–21, 1989;

Schalk T. B., "Automating Operator-Assisted Calls Using Speech Recognition", Eurospeech 89, Vol 1 pp. 441–444, 1989;

Veith R. H., "Information Retrieval via Telephone Keypad and Voice: Experiences with Telephone Directories", National Online Meeting Proceedings, Vol 1 pp. 443–451, 1990;

Veith R. H., "Operator Assisted Services with Automated Responses", Audiotex, Vol 1 pp. 19–28, 1986;

Rabiner L., Juang B., *Fundamentals of Speech Recognition*, Prentice-Hall, 1993, pp. 43–52;

Hall, P. A. "Approximate string matching", Computing surveys, Vol. 12(4), pp. 381–402, 1980;

Salomaa, A., "Computation and Automatation", Cambridge University Press, 1985, pp. 44–55;

Tremblay, J. P.; Sorenson, P. G., "An introduction to data structures with applications", McGraw-Hill, 1976, pp. 316–318;

Vitale, T. "An algorithm for high accuracy name pronunciation by parametric speech synthesizer", Computational Linguistics, Vol. 17(3), pp. 257–276, 1991;

Lorenz, A., *Stochastic Automata Constructive Theory*, John Wiley and Sons, 1974; and Aldefeld, B. "Automated directory listing retrieval system based on isolated word recognition", Proceedings of the IEEE, Vol. 68(11), pp. 1364–1379, 1980.

The disclosures of all above references and publications cited therein are hereby incorporated by reference.

SUMMARY OF THE INVENTION

The present invention seeks to provide an improved system for accessing a computerized database from a location which is not in computer communication with the database.

There is thus provided in accordance with a preferred embodiment of the present invention a database accessing system for processing a request to access a database including a multiplicity of entries, each entry including at least one word, the request including a sequence of representations of possibly erroneous user inputs, the system including a similar word finder operative, for at least one interpretation of each representation, to find at least one database word which is at least similar to that interpretation, and a database entry evaluator operative, for each database word found by the similar word finder, to assign similarity values for relevant entries in the database, the values representing the degree of similarity between each database entry and the request.

Further in accordance with a preferred embodiment of the present invention the request includes a sequence of unambiguous representations of possibly erroneous user inputs.

Still further in accordance with a preferred embodiment of the present invention the relevant entries include all database entries having the database word in an individual context.

Additionally in accordance with a preferred embodiment of the present invention the request includes a sequence of ambiguous representations of possibly erroneous user inputs and also including an ambiguous input evaluator operative to identify at least one interpretation of each ambiguous representation and to provide the interpretation to the similar word finder.

Further in accordance with a preferred embodiment of the present invention the ambiguous input evaluator includes a database analyzer operative to extract database characteristics from the database.

Still further in accordance with a preferred embodiment of the present invention the system also includes a session manager receiving similarity values from the database entry evaluator and operative to interactively provide a user sensible message based on the similarity values.

Additionally in accordance with a preferred embodiment of the present invention the session manager is operative to prompt the user to provide the request by orally spelling at least one database word.

Further in accordance with a preferred embodiment of the present invention the session manager is operative to prompt the user to provide the request by pronouncing at least one database word.

Still further in accordance with a preferred embodiment of the present invention the session manager is operative to prompt the user to provide the request by keying at least one database word on the keypad.

There is additionally provided in accordance with a preferred embodiment of the present invention a database accessing system for processing a request to access a database including a multiplicity of entries, each entry including at least one word, the request including at least one ambiguous representation of at least one possibly erroneous user input, the system including an ambiguous input evaluator operative to identify at least one interpretation of each ambiguous representation, a similar word finder operative, for at least one interpretation of each representation, to find at least one database word which is at least similar to that interpretation, and a database entry evaluator operative, for each database word found by the similar word finder, to assign similarity values for relevant entries in the database, the values representing the degree of similarity between each database entry and the request.

Further in accordance with a preferred embodiment of the present invention the relevant entries include all database entries having the database word in an individual context.

Still further in accordance with a preferred embodiment of the present invention the ambiguous input evaluator includes a database analyzer operative to extract database characteristics from the database.

Yet further in accordance with a preferred embodiment of the present invention the system also includes a session manager receiving similarity values from the database entry evaluator and operative to interactively provide a user sensible message based on the similarity values.

Additionally in accordance with a preferred embodiment of the present invention the session manager is operative to prompt the user to provide the request by orally spelling at least one database word.

Further in accordance with a preferred embodiment of the present invention the session manager is operative to prompt the user to provide the request by pronouncing at least one database word.

Yet further in accordance with a preferred embodiment of the present invention the session manager is operative to prompt the user to provide the request by keying at least one database word on the keypad.

There is still further provided in accordance with a preferred embodiment of the present invention a database accessing method for processing a request to access a database including a multiplicity of entries, each entry including at least one word, the request including a sequence of representations of possibly erroneous user inputs, the method including finding, for at least one interpretation of each representation, at least one database word which is at least similar to that interpretation, and assigning similarity values for relevant entries in the database, for each database word found, the values representing the degree of similarity between each database entry and the request.

There is provided in accordance with a preferred embodiment of the present invention a database accessing method for processing a request to access a database including a multiplicity of entries, each entry including at least one word, the request including at least one ambiguous representation of at least one possibly erroneous user input, the method including identifying at least one interpretation of each ambiguous representation, finding, for at least one interpretation of each representation, at least one database word which is at least similar to that interpretation, and for each database word found by the similar word finder, assigning similarity values for relevant entries in the database, the values representing the degree of similarity between each database entry and the request.

In the present specification and claims, many examples from zip code database applications are provided in which address information is provided and, in response, the zip code of the address is accessed. However, the term "database" as used herein is intended to include any type of database including but not limited to databases including financial and commercial data, databases including administrative data such as personnel data, transportation vehicle flight schedule databases, databases including technological data such as weather data, and databases including population data such as zipcode directories, classified and unclassified telephone directories.

BRIEF DESCRIPTION OF THE DRAWINGS

The present invention will be understood and appreciated from the following detailed description, taken in conjunction with the drawings in which:

FIG. 10 is a simplified block diagram of one implementation of the apparatus of FIG. 1 in which the ambiguous input comprises output of a probabilistic spoken character recognition device;

FIG. 11 is a simplified block diagram of one implementation of the apparatus of FIG. 1 in which the ambiguous input comprises output of a probabilistic spoken phoneme recognition device;

Attached herewith are the following appendices which aid in the understanding and appreciation of one preferred embodiment of the invention shown and described herein:

Microfiche Appendix A is a computer listing of a preferred software implementation of a telephone directory database access system;

Microfiche Appendix B is an example of an alphabet definition file.

Microfiche Appendix C is an example of a "resource" file.

Microfiche Appendix D is an example of a "conversation manager decision table" file.

Microfiche Appendix E is an example of an "error messages" file.

Microfiche Appendix F is an example of a "phonetic translation rules" file.

DETAILED DESCRIPTION OF A PREFERRED EMBODIMENT

Figure 1:
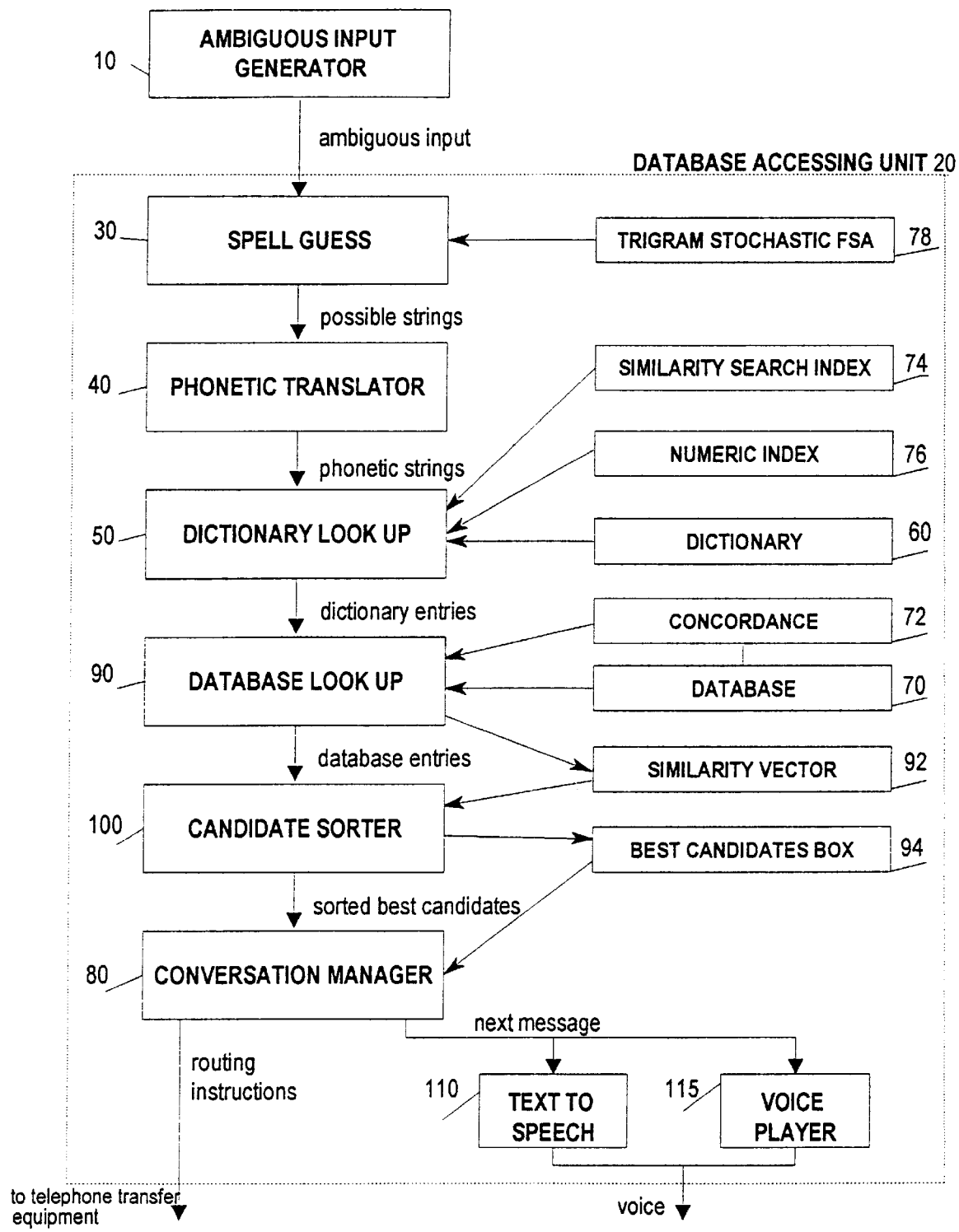
FIG. 1 is a high level functional block diagram of a database access system constructed and operative in accordance with a preferred embodiment of the present invention.

Reference is now made to FIG. 1 which is a high level functional block diagram of a database access system constructed and operative in accordance with a preferred embodiment of the present invention.

The database access system includes an ambiguous input generator 10 and a database accessing unit 20 accessing a data-base on the basis of ambiguous input received from generator 10. The ambiguous input generator 10 provides ambiguous input such as ambiguous keystroke input or ambiguous speech input such as ambiguous oral character input or ambiguous oral phoneme input, as illustrated below with reference to FIGS. 9–11 respectively.

The output of the ambiguous input generator 10 is received by a spellguess unit 30 which is operative to select at least one string of symbols to which the ambiguous input might correspond, and preferably a plurality of strings of symbols, each associated with a probability. Each string of symbols may, for example, comprise a string of characters such as English language letters or may comprise a string of phonemes suitable for representing the dictionary alphabet. For example, the output of the spellguess unit may comprise the N most probable strings and their probabilities, where N is any suitable number such as 20.

A preferred method of operation for spellguess unit 30 is described below with reference to FIG. 2.

A phonetic translator 40 receives the possible strings generated by spellguess unit 30 and translates each of them into phonetic form. A preferred method for generating translator 40 is described below with reference to FIG. 3. If translator 40 is generated by the method of FIG. 3, the complexity of phonetic translator 40 is independent of the number of phonetic rules as described below with reference to FIG. 3. Alternatively, however, conventional phonetic translation methods may be employed such as the methods described in the following publication:

Vitale, T. "An algorithm for high accuracy name pronunciation by parametric speech synthesizer", Computational Linguistics, Vol. 17(3), pp. 257–276, 1991.

In the illustrated embodiment, the phonetic translator converts strings in the English alphabet to strings in a phonetic alphabet such as the DECvoice phonetic alphabet developed by Digital Equipment Corporation. More generally, however, the phonetic translator may be operative to translate strings from any first alphabet into any second alphabet. The DECvoice phonetic alphabet is described in the following publication:

Klatt, D. H., "Review of text-to-speech conversation for English", Journal of the Acoustical Society of America, Vol. 82(3), p. 769.

Alternatively, the phonetic translator may be omitted in which case the access to the dictionary may be based directly on the guessed strings rather than on the translation of the guessed strings into phonetic form.

A dictionary look up unit 50 receives each phonetic or alphabetical string and conducts a similarity search within a dictionary 60.

A preferred method of operation for dictionary lookup unit 50 is described below with reference to FIG. 4.

The dictionary 60 comprises an alphabetical or phonetically ordered or otherwise ordered list of some or all words or strings appearing in the database 70 which is to be accessed. A concordance 72 associates the dictionary 60 with the database 70. A similarity search index 74 allows the dictionary 60 to be searched for entries which are similar to a desired user-selected string. A numeric index 76 is provided if a telephone keypad is used which extracts from the dictionary all entries having a given numerical code. A trigram stochastic finite state automaton 78 stores trigrams and their probabilities and is accessed by spellguess unit 30, as described in more detail below.

Figure 7:
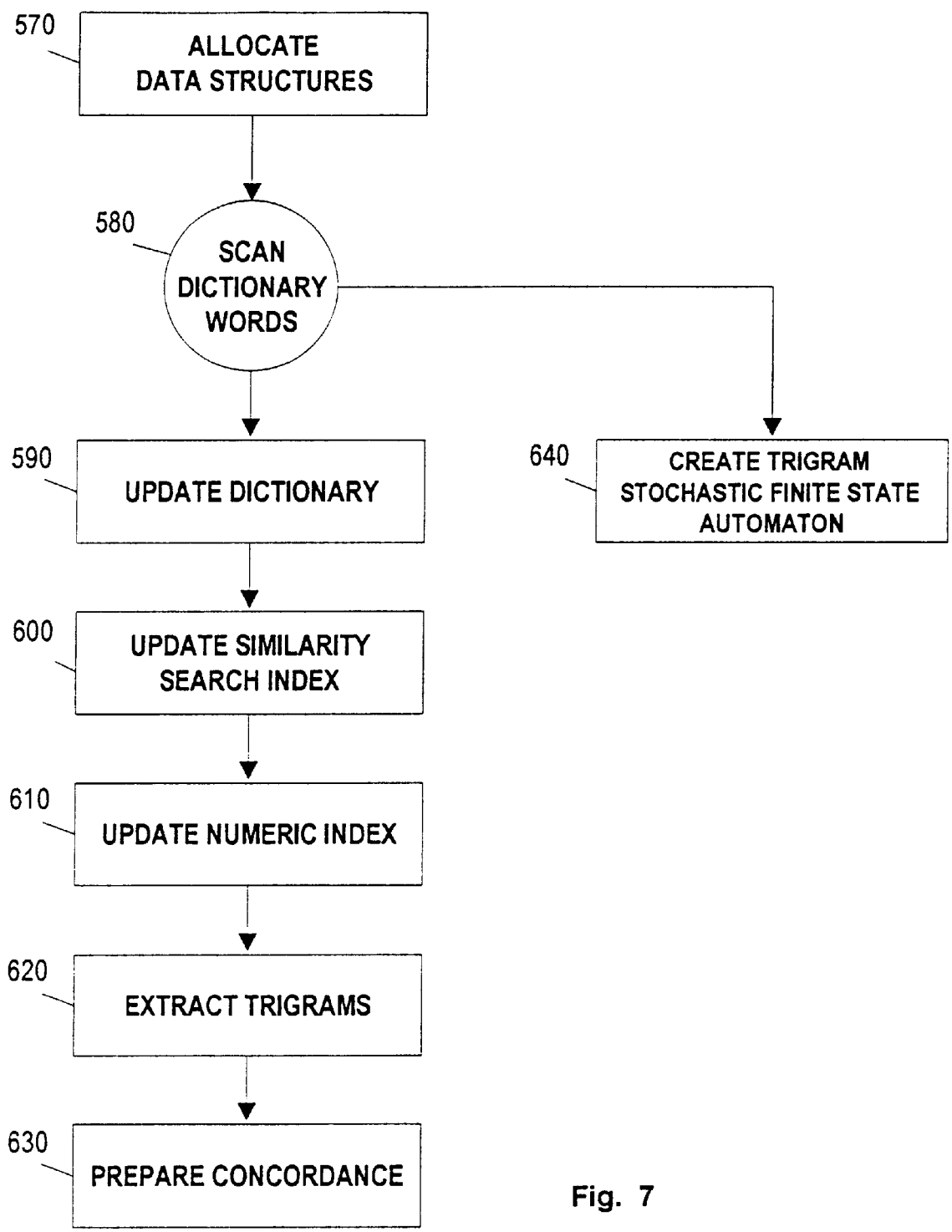
FIG. 7 is a flowchart illustrating a preferred method for loading the dictionary, similarity index, numeric index and trigram stochastic finite state automaton into memory, as well as for preparing the concordance.

Dictionary 60, database 70, concordance 72, numeric index 76 and trigram stochastic finite state automaton 78 may be stored in any suitable electronic medium such as a hard disc or RAM. A preferred method for loading the dictionary, similarity index, numeric index and trigram automaton into memory, as well as for preparing the concordance, is described below with reference to FIG. 7. A preferred method for loading the database into memory and for updating the concordance prepared by the method of FIG. 7 is described below with reference to FIG. 8.

Alternatively, the dictionary 60 may comprise the database itself, particularly if the database is small and/or if the database does not include many duplicated strings.

The output of the dictionary lookup unit 50 typically comprises, for each string received from unit 30 or 40:

a. A possibly empty list of dictionary entries whose similarity to the string is better than or equal to a predetermined similarity threshold; and b. A similarity score representing the degree of similarity between that entry and the corresponding string.

EXAMPLE: The operation of spellguess unit 30, phonetic translator 40 and dictionary lookup 50 for the following ambiguous telephone keypad input: 228437463 is now described.

Spellguess unit 30 guesses various spellings, among which, for the purposes of this example, the word CATHERINE is assumed to appear. This word is input to the phonetic translator 40, which may translate it into (K Ae Th Eh R Ih N). The phonetically translated string is sent to the dictionary look up unit 50, which may produce the following list of dictionary words and corresponding similarity scores:

(KATHERINE, 100), (CATHERINE, 100), (CATHYRINE, 95), (KATHERYN, 92), (KATHRINE, 92), (KATHRYN, 85), (CATHRYN, 85).

According to one embodiment of the present invention, the database 70 is now accessed by a database look up unit 90 so as to identify, for each dictionary entry, all database entries which include that dictionary entry.

Preferably, however, the database entries identified by database lookup 90 for each dictionary entry include only those database entries which include the dictionary entry in the correct context. For example, in zip code directory applications, a conversation manager 80 may direct the user to enter the name of the city of interest and subsequently to enter the name of the street of interest. In this case, the database entries identified for a dictionary entry comprising a putative street name comprise only those database entries having that street name.

Database lookup unit 90 generates and continually updates, as the call or database access session progresses, a similarity vector 92. The similarity vector 92 has a number of vector components which correspond to the number of database entries. Each similarity vector component stores a similarity score of the corresponding database entry. This similarity score is provided by the dictionary lookup 50 for each user-supplied word as the database access session proceeds. The database lookup 90 accumulates these similarity scores in the appropriate locations within the similarity vector.

After each word is supplied by the user, and the similarity vector is updated by the database lookup 90, or concurrently with the updating process, a candidate sorter 100 extracts a predetermined number of the highest scoring similarity vector components and stores these components in a best candidates box 94. The similarity vector 92 and best candidates box 94 are preferably stored in computer memory and are initialized at the beginning of each database access session.

A preferred method of operation for units 90 and 100 is described below with reference to FIG. 5.

The conversation manager 80 receives the output of unit 90 or 100 and determines a course of action. The considerations of the conversation manager may, for example, include the following:

a. If one database entry has a similarity score which significantly exceeds the similarity score of all other candidates and which exceeds a threshold similarity score, this entry may be deemed correct and therefore is presented to the user for confirmation.

b. Typically, each entry in database 70 comprises a plurality of words or strings. For example, each entry in a zipcode directory typically includes some or all of the following words: state name, street name, street type, house number, locality. If this is the case, and processing of one string (such as "locality") does not provide a conclusive indication of the correct database entry, the conversation manager may decide to prompt the user to enter information identifying another word within the desired database entry (such as "street name").

c. If a small number of entries have similar or identical scores, the conversation manager may decide to present all of these to the user and prompt the user to select one of them about which s/he wishes to receive more information.

d. If a large number of entries have similar or identical scores and all strings within the entry have been processed, the conversation manager may wish to refer the user to the services of a human operator. In this case, the conversation manager 80 provides a suitable routing instruction to conventional telephone equipment which routes the user to a human operator.

A preferred method of operation for conversation manager 80 is described below with reference to FIG. 6.

The output of the conversation manager is a suitable message to the user which is received by a text-to-speech voice synthesizer 110, such as DECvoice, commercially available from Digital Equipment Corporation, Maynard, Mass., USA or Text Assist, commercially available from Creative Labs, Inc., Milpitas, Calif., USA. Alternatively or in addition, the output of the conversation manager may be received by a pre-recorded voice player 115 which plays a selected message from among a plurality of recorded messages. Examples of a commercially available voice player 115 include the DECvoice or Sound Blaster, commercially available from Creative Labs, Inc., Milpitas, Calif., USA. The text-to-speech voice synthesizer 110 and/or the voice player 115 provide an audible message which is transmitted over the telephone line to the user.

As described briefly above, the apparatus of FIG. 1 utilizes the following data structures in order to perform a similarity dictionary lookup, rather than an exact match lookup, and to support spell guess functions:

a. Word dictionary 60—A list of entries which includes a single entry for each uniquely spelled database word for which direct access is required.

For example, if the database is a zip code directory, the words in the database which are to be accessed directly may include only the localities or alternatively, the state as well as the street name and locality. The dictionary includes a count for every word appearance in the database in the specific context, and a pointer to the concordance. For example, if the word MARYLAND appears in the database as a state name, a city name and a street name, the dictionary will contain only a single entry for the word MARYLAND, with separate counters for the number of times the word appears as state name, city name and street name, and a single pointer to the concordance, which points to the first occurrence of the word MARYLAND in the concordance.

b. Concordance 72—A list of entries including a single entry for each occurrence of each dictionary word in the database.Concordance entries relating to the same dictionary word are always arranged consecutively and sorted, within the dictionary word, according to the entry context (for example, appearances of the dictionary word in a locality context, followed by appearances of the dictionary word in a street name context). Each database entry is pointed to by all concordance entries corresponding to that database entry.

For Example, the Following Database Entry:

573 MARYLAND, BUFFALO, N.Y. 14201 will be pointed to by a corresponding MARYLAND entry in the concordance, a corresponding BUFFALO entry in the concordance and a corresponding N.Y entry in the concordance.

If database entries residing in consecutive addresses correspond to a plurality of concordance entries residing in consecutive addresses, the plurality of concordance entries may be replaced by a single entry pointing to the range of database entries.

Figure 12:
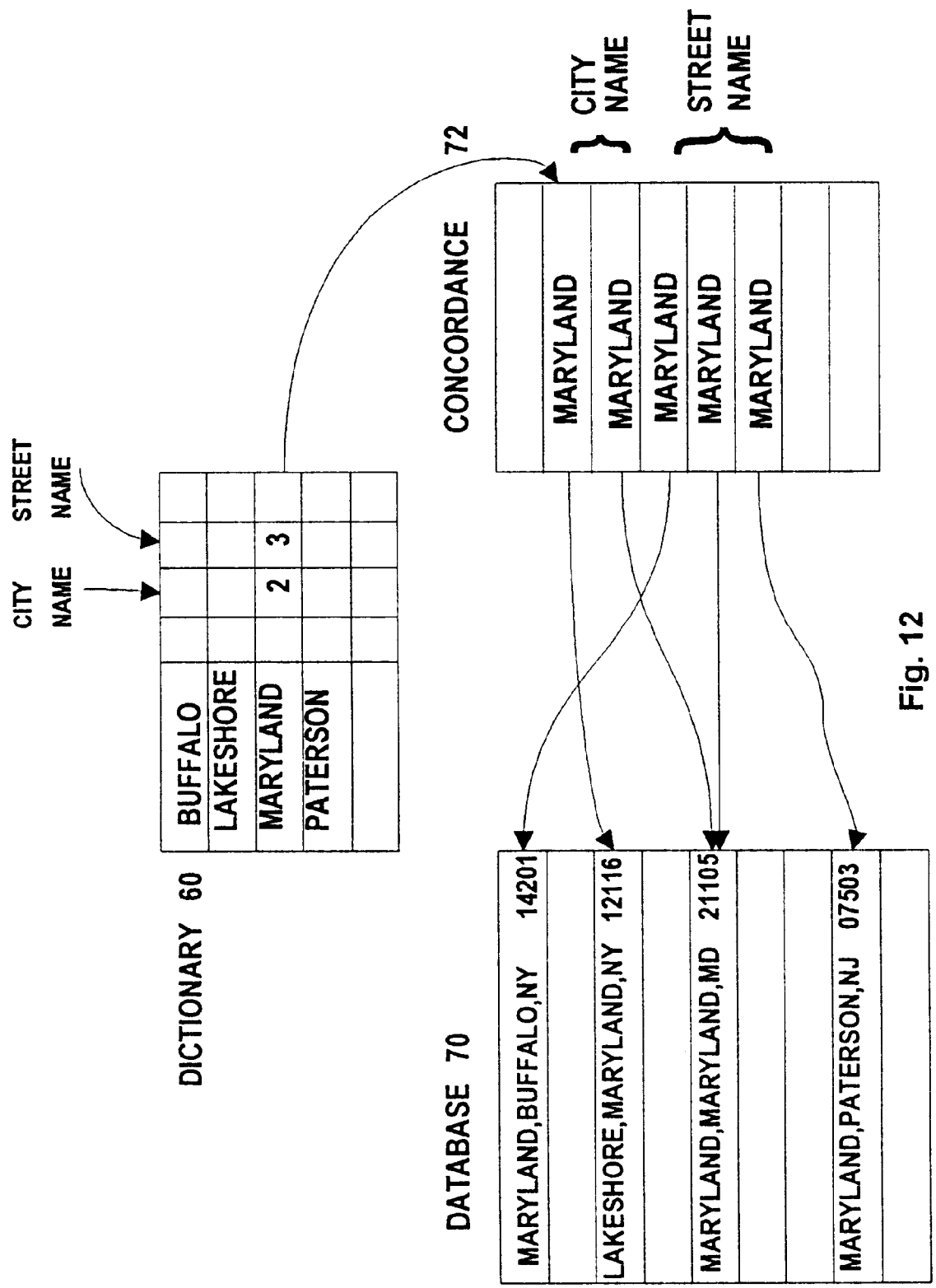
FIG. 12 is a diagram of the computer memory data structures serving the apparatus of FIG. 1, including a dictionary, concordance and database storing typical data and the internal connections between these structures.

The associations between the database, dictionary and concordance are illustrated in the diagram of FIG. 12.

c. Similarity search index 74—An index into the word dictionary that enables access to the word dictionary by word similarity rather than by exact match of words.

The similarity search index is preferably organized as an N-ary tree in which each node points to its left son and its right brother. An N-ary tree is a well-known data structure which is described in Tremblay, J. P.; Sorenson, P. G., "An introduction to data structures with applications", McGraw-Hill, 1976, pp. 316–318.

The similarity search index is built in several tree layers, such as 7 or 9 layers. Each layer corresponds to a different "reduced alphabet" of the dictionary alphabet, which may be either graphic or phonetic. One example of a reduced alphabet for the English language alphabet is an alphabet including only two symbols, c for consonants and v for vowels. The correspondence between the English alphabet and the reduced alphabet is that all consonants are replaced by c and all vowels are replaced by v. More generally, a reduced alphabet is an alphabet that contains less symbols than an original alphabet and complies with the following criteria:

1) each symbol in the reduced alphabet represents a group of symbols of the original alphabet;
2) a symbol of the original alphabet appears in only one group; and
3) the union of all groups comprises the complete original alphabet.

Each layer of the similarity search index contains the same dictionary words but in a different reduced alphabet.

Each word in the similarity search index is represented in vector format with a reduced alphabet. A word in vector format is represented by a vector V of length L, where L is the number of symbols in the alphabet. Each element Vi of the vector contains the number of occurrences of the ith alphabetic symbol in the word. For example, given an alphabet {a,b,c} and a word "abbac", the vector representation is "2,2,1". To continue the above example of the {c,v} alphabet, the words BLAKE and GRACE will both be expressed by the pair "2,3". Each layer of the similarity search index is built with a different reduced alphabet adhering to the above guidelines.

Figure 13:
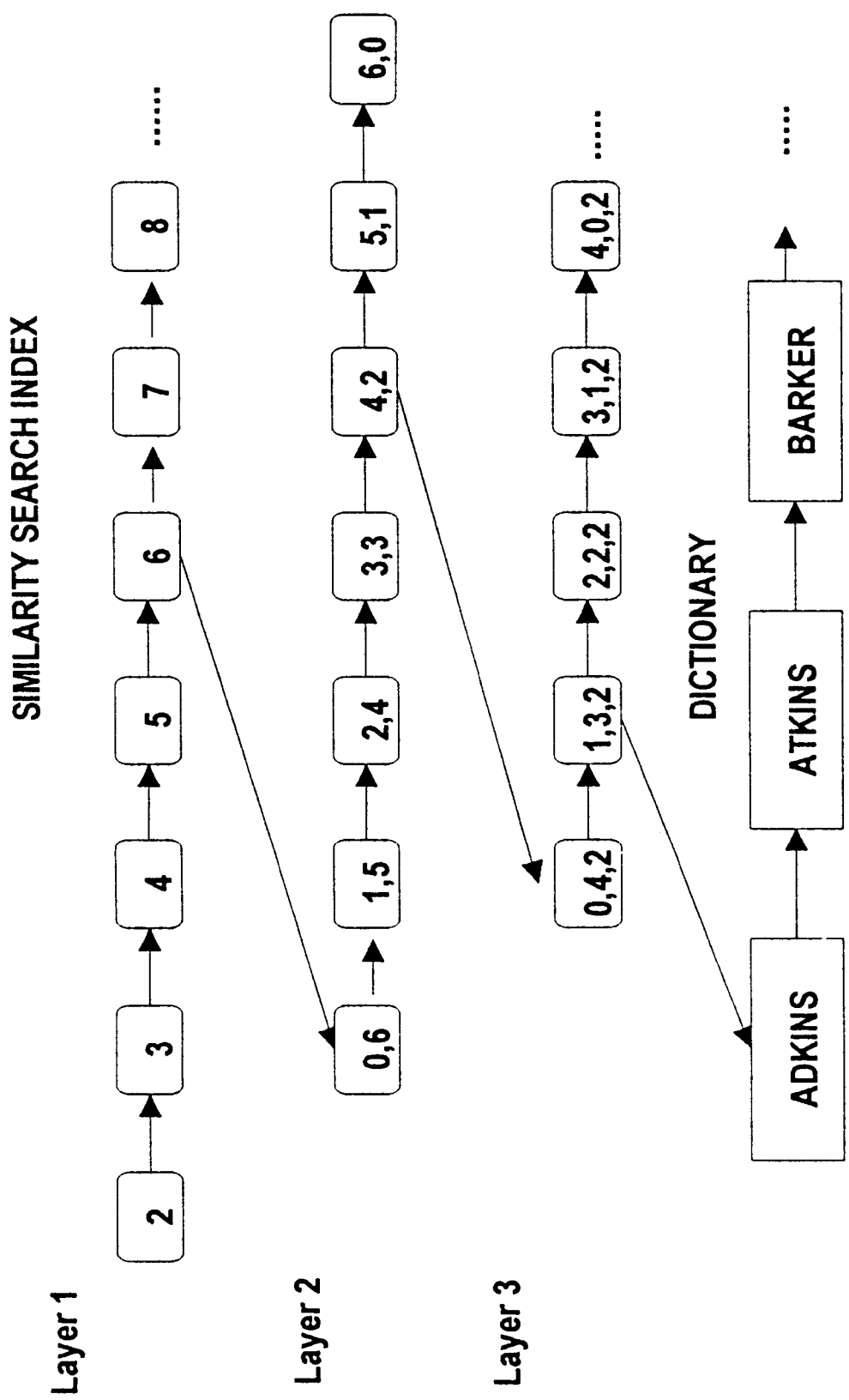
FIG. 13 is a diagram of a similarity search index, storing typical data, which is useful in performing the dictionary look-up method of FIG. 4.

FIG. 13 illustrates an example of a "grapheme based" similarity search index for an English language dictionary. It is appreciated that, alternatively, a phonetic-based similarity search index may be employed. The index of FIG. 13 is an N-ary tree which includes the following three layers:

Layer 1 is based on a single symbol reduced alphabet which transforms each English language word into its length.

Layer 2 is based on a two symbol alphabet, which transforms each English word into an ordered pair (a,b) where a is the number of consonants in the word and b is the number of vowels.

Layer 3 is based on three symbols, which transforms each English word into an ordered triplet (a,b,c) where a is the number of letters from among the set (P, F, B, V, W, T, D) in the word, b is the number of letters from among the remaining consonants in the word and c is the number of vowels in the word.

Each dictionary word is mapped to one node in each index layer. For example, the word ADKINS appearing in FIG. 13 is mapped into node (6) in layer 1 since ADKINS contains 6 letters, into node (4,2) in layer 2, since ADKINS contains 4 consonants and 2 vowels, and into node (1,3,2) in layer 3 since only the letter D belongs to the set (P, F, B, V, W, T, D), and there are 3 other consonants, and 2 vowels.

d. Numeric index 76—This index is organized as a balanced tree, and is employed when the ambiguous input generator is a keypad in which one number is used to represent a plurality of letters, such as a telephone keypad. The numeric index uses the ambiguous numeric input value keyed in by the user of the keypad to point directly to all dictionary entries having that numeric input value.

e. Trigram stochastic finite state automaton 78—An automaton that stores all trigrams appearing in the dictionary along with their probabilities which are computed based on dictionary appearance frequencies. The trigram stochastic finite state automaton is employed by spell guess unit 30 to anticipate the probable spelling of any given ambiguous string.

Reference is now made to FIG. 7 which illustrates a preferred method for loading the dictionary, similarity index, numeric index and trigram automaton into computer memory, as well as for preparing the concordance in the computer memory.

The method of FIG. 7 preferably includes the following processes:

a. Allocate data structures (process 570)—This process creates the initial structures for the word dictionary, the concordance, similarity search index, the numeric index and the trigram stochastic finite state automaton.

b. Scan dictionary words (process 580)—This loop reads all dictionary words from a dictionary organized as a sequential disk file. For each word the following processes are performed:

i. Update word dictionary (process 590)—This process copies the word into the dictionary.

ii. Update similarity search index (process 600)—The word is translated into the reduced alphabet of every layer of the index. All index layers are searched, from the highest to the lowest level, and any missing words are added.

iii. Update numeric index (process 610)—If the numeric code of the word does not exist in the index, it is added. Once the numeric code of the word does exist, a pointer is added to it which points at the newly entered word.

iv. Extract trigrams (process 620)—All trigrams contained in the new word are stored in a temporary list. Each time a trigram on the list appears, an associated frequency value is incremented. The trigram list including frequency values are employed to construct the automaton in process 640, once all dictionary words have been processed by loop 580.

Prepare concordance entries (process 630)—Each dictionary word occupies one or more entries in the concordance. The concordance entries are created at this time, but are not associated with database entries pointers until the database itself is loaded into memory.

c. Create trigram stochastic finite state automaton (process 640)—Based on the trigram information (population and frequencies) accumulated by process 620, a stochastic finite state automaton is built. This automaton will be later used by spellguess unit 30 to guess the spelling of the ambiguous input string. A stochastic finite state automaton is described in the above-referenced publication by Lorenz.

Figure 8:
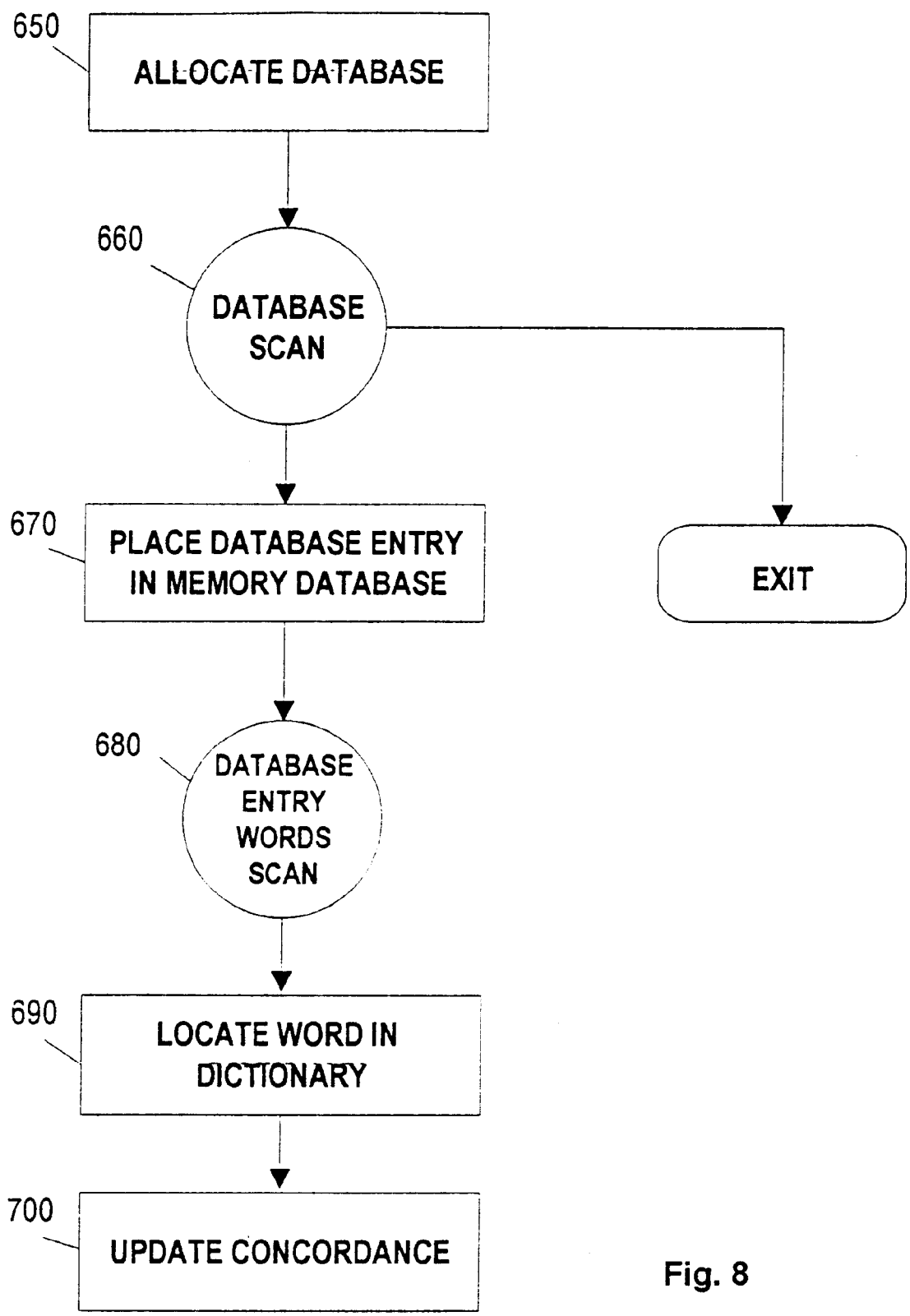
FIG. 8 is a flowchart illustrating a preferred method for loading the database into memory and for updating the concordance prepared by the method of FIG. 7.

Reference is now made to FIG. 8 which illustrates a preferred method for loading the database into memory and for updating the concordance prepared by the method of FIG. 7.

The method of FIG. 8 preferably includes the following processes:

a. Allocate database (process 650)—Prepares the memory required to hold the entire database.

b. Database scan loop 660—Reads a plurality of database entries stored in sequential format and residing on magnetic media, such as hard disk drive. For every database entry, the following processes are performed:

I. Place database entry in memory database (process 670)—Finds the next available place in memory database, places the database entry there, sets a direct pointer from every database word to the dictionary, and keeps the direct memory address in order to allow further direct addressing to the entry (from the concordance).

II. Inner database entry word scan loop (process 680)—Scans all the database entry words that are defined as requiring direct access through the dictionary and concordance. For every such word, the process performs the following two processes:

i. Locate word in dictionary (process 690)—Since the dictionary is loaded before the database, and since every word requiring direct access has to be present in the dictionary, this process locates the word entry in the dictionary, in order to locate the right entry in the concordance, that corresponds to this database entry.

ii. Update concordance (process 700)—Adds a pointer from the concordance entry to the database entry. This pointer establishes a link between a dictionary word and the corresponding database entries.

Figure 2:
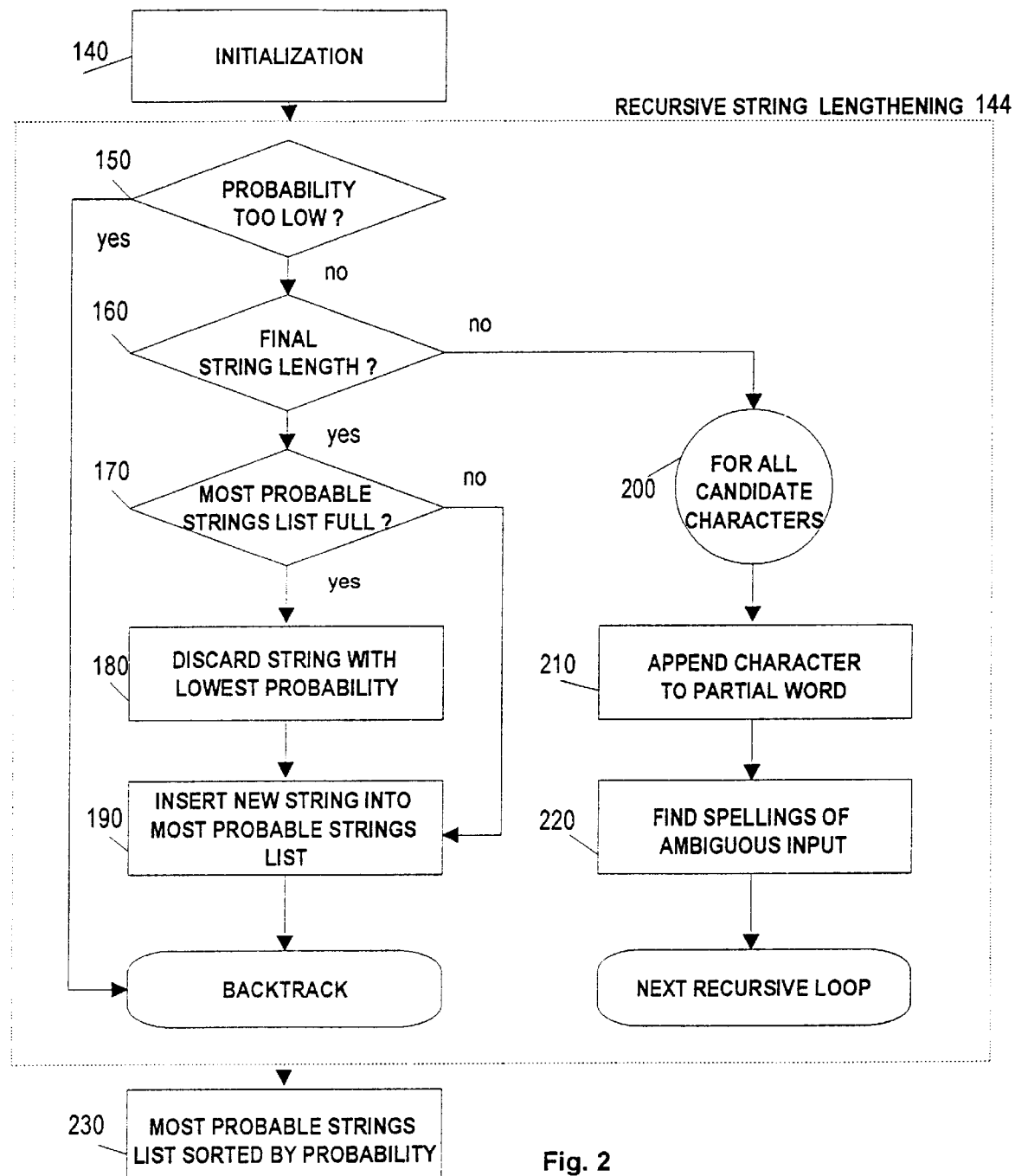
FIG. 2 is a flowchart illustrating a preferred method of operation for the spellguess unit of FIG. 1.

Reference is now made to FIG. 2 which illustrates a preferred method of operation for spellguess unit 30. As described above, spellguess unit 30 is preferably operative to select a plurality of strings of characters to which ambiguous input might correspond, each associated with a probability. In the illustrated embodiment, the output of the spellguess unit is the N most probable strings and their probabilities, where N is any suitable number such as 20.

The method of FIG. 2 preferably includes the following processes:

a. An initialization process 140 in which an initial string is constructed. The process then invokes a recursive string lengthening process 144, until all possible spelling alternatives have been checked.

b. A recursive string lengthening process 144 including blocks 150–220 which generates a list of the N most probable strings and their probabilities, based on pre-known frequencies of various "trigrams" or 3-letter strings in the dictionary. Process 144 receives as input a partial string of length L whose probability has already been computed and computes the probability of at least one string of length L+1 which includes the input partial string. If the length of the partial string is less than 3 (if trigram frequencies are employed), the partial string is taken to include two "dummy" characters such as two #'s.

c. Output process 230—the N most probable strings are copied onto a digital storage medium such as computer memory. Preferably, the N most probable strings are retained as a heap sorted by their probabilities.

For example, suppose that the numeric string "2874" is a keypad input to spellguess unit 30, which is intended by the caller to represent the name "BUSH". Spellguess unit 30 uses the method of FIG. 2 in order to produce a list of the most probable strings represented by the numeric string "2874", along with their probabilities.

An example of such a list is as follows:(BURG, 0.1611), (BURI, 0.1259), (CURG, 0.1118), (BUSH, 0.1086), (CUSH, 0.1018), (CURI, 0.0874).

As described in detail below, the probability of an individual candidate string is based on the probabilities of each trigram included in the string. For example, the probability assigned to BURG might be roughly the product of the known frequencies of occurrence of each of the following trigrams: BUR, URG.

The blocks of the recursive spellfinding process are now described in detail:

Block 150: "Minimum probability" is typically 0 if less than N strings have been accumulated. If N strings have already been accumulated, "minimum probability" is equal to the probability of the least probable of the N strings.

If the probability of the input partial string is less than "minimum probability", the process backtracks to the previous recursive level because the probability of the input partial string will only decline further as its length increases.

Block 160: If the partial string is, in fact, a "final" string, i.e. a string of the length which the user entered, then it is entered onto a list, typically organized as a heap, of most probable strings (block 190). Otherwise, the process advances directly to block 200.

If the list already contains N strings (block 170), the lowest probability string is discarded (block 180) before the new string is inserted (block 190).

At this point, the string is lengthened by considering the possible characters which might fill the (L+1)'th position in the string. For example, if keypad input is employed and the user punched the #2 key for the L+1'th position, the candidate characters are A, B and C. For each candidate character, blocks 210 and 220 are performed.

Block 210: The candidate character is concatenated with the partial string and the probability of the new, longer partial string is defined by generating the product of the probability of the previous partial string and the probability of the trigram consisting of the last three characters of the new, longer partial string.

Block 220: The next recursive level of the string lengthening process begins, thereby to add yet another character to the current partial string.

Figure 3:
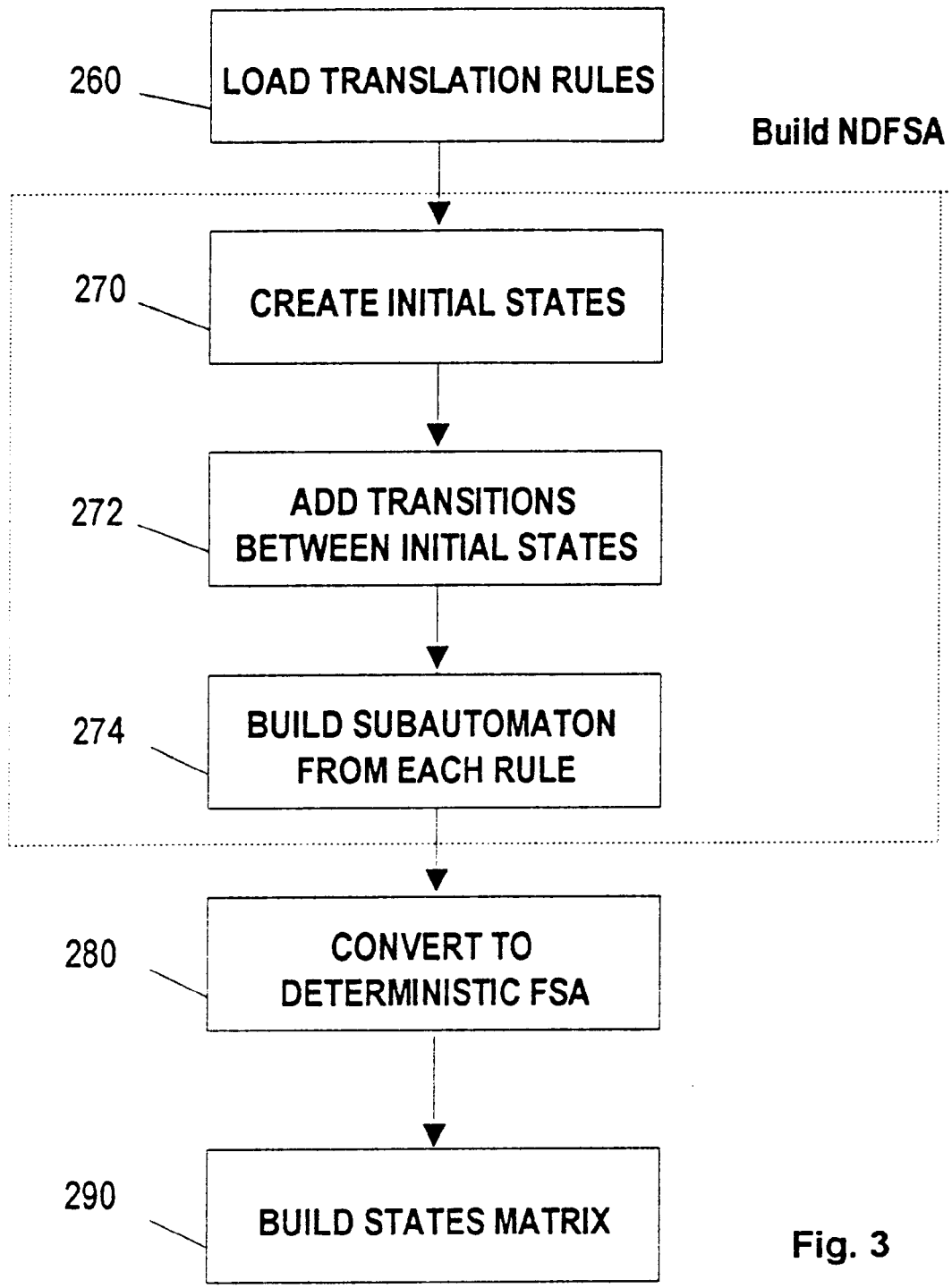
FIG. 3 is a flowchart illustrating a preferred method for generating the phonetic translator of FIG. 1.

Reference is now made to FIG. 3 which illustrates a preferred method for generating phonetic translator unit 40. As described above, phonetic translator unit 40 is preferably operative to convert strings from one alphabet (such as English), into another alphabet (such as the DECvoice phonetic alphabet). The complexity of the phonetic translator is n, where n is the length of the string to be converted, regardless of the number of phonetic translation rules. The method of FIG. 3 preferably includes the following processes:

Process 260: Load translation rules: read an external file that describes phonetic translation rules for translating between the alphabets employed. For example, Microfiche Appendix F is a description of the phonetic translation rules for translating from English to DECvoice. Preferably, the syntax of the external file is checked. The structure of a rule is as follows: grapheme→phoneme/"preceding substring"_"following substring"

The above rule instructs the phonetic translator to translate a certain grapheme to a certain phoneme if the grapheme is preceded by a certain "preceding substring" and is followed by a certain "following substring". Any of the phoneme, preceding substring and following substring can be empty.

Following are some examples of phonetic translation rules:

| | |
|---|---|
| BB->B | double Bs sound like a single B (BUBBLE) |
| PH->F | P followed by H always sound like F (PHONE) |
| O->Uh/W__L | O preceded by W and followed by L, sounds like the phoneme Uh (WOLF) |
| Y->Ay/c__cE | Y preceded by any consonant and followed by a consonant that is followed by E, sounds like |

(BYTE)

A non-deterministic automaton is now generated. Processes 270, 272 and 274 create a single non-deterministic finite state automaton (NDFSA) from all the phonetic translation rules loaded in process 260. Each of these processes is now described in detail:

Process 270: Build states S0, S1 and S2 where: S0 is the initial state for all rules that have 2 characters in their "preceding substring" S1 is the initial state for all rules that have 1 character in their "preceding substring", and S2 is the initial state for all rules that do not have a "preceding substring".

Additional states may be defined similarly if it is desired to accommodate preceding strings which are more than 2 characters long.

Process 272: Add unconditional transitions from S0 to S1 and from S1 to S2 such that the entire grapheme alphabet causes the automaton to proceed from state S0 to S1 or from S1 to S2.

Process 274: Build a subautomaton for each phonetic rule. The subautomaton for an individual phonetic rule has n states, where n is the total number of characters in the "preceding substring", the grapheme and the "following substring". The last, n'th, state is also termed herein the Accepting State. Add transitions from each state to the next state which are respectively determined by the characters of the preceding substring, grapheme and following substring. The output generated by the subautomaton is the phoneme which the rule in question associates with the preceding substring, grapheme and following substring.

For example, the rule O→Uh/W__L, has 3 states, such as for example (S10,S11,S12) and 3 transitions: W as preceding substring causes a transition from the initial state to state S10, O as grapheme causes a transition from S10 to S11, and L as following substring causes a transition from S11 to the accepting state S12. The output of the subautomaton for the above sample rule is the phoneme (Uh). Since this rule has one character, W, in the "preceding substring", then state S1 serves as its initial state. Therefore, the subautomaton for this rule comprises the following transitions: (S1,W,S10), (S10,O,S11), (S11,L,S12).

Process 280: Convert the non-deterministic automaton (NDFSA) constructed in processes 270–274 into a deterministic finite state automaton (DFSA) including all the phonetic translation rules. The conversion process may be based on well known methods, such as the conversion method described in Salomaa, A., *Computation and automata*, Cambridge University Press, 1985, pp. 44–55.

Process 290—Build states matrix: Convert the DFSA created by process 280 into a matrix, where the rows correspond respectively to the states in the DFSA and the columns correspond respectively to the possible inputs i.e. to the grapheme alphabet. The contents of each matrix cell includes: the next state, whether the state is an accepting state or not, and the phoneme generated by an accepting state.

Once the phonetic translator 40 has been generated as described above, the phonetic translator is operative to translate a graphic word into a phonetic word as follows:

Given a graphic word, such as a word in English, apply the states matrix created in process 290 thereon, and output a phonetic word, which is the phonetic representation of the input grapheme word. The following examples illustrate the outputs of the phonetic translator unit 40 for a variety of inputs:

| | |
|---|---|
| grapheme input word: BUBBLE | phonetic output word: B Ah B L |
| grapheme input word: PHONE | phonetic output word: F Ao N |
| grapheme input word: BYTE | phonetic output word: B Ay T |
| grapheme input word: WOLF | phonetic output word: W Uh L F |

Figure 4:
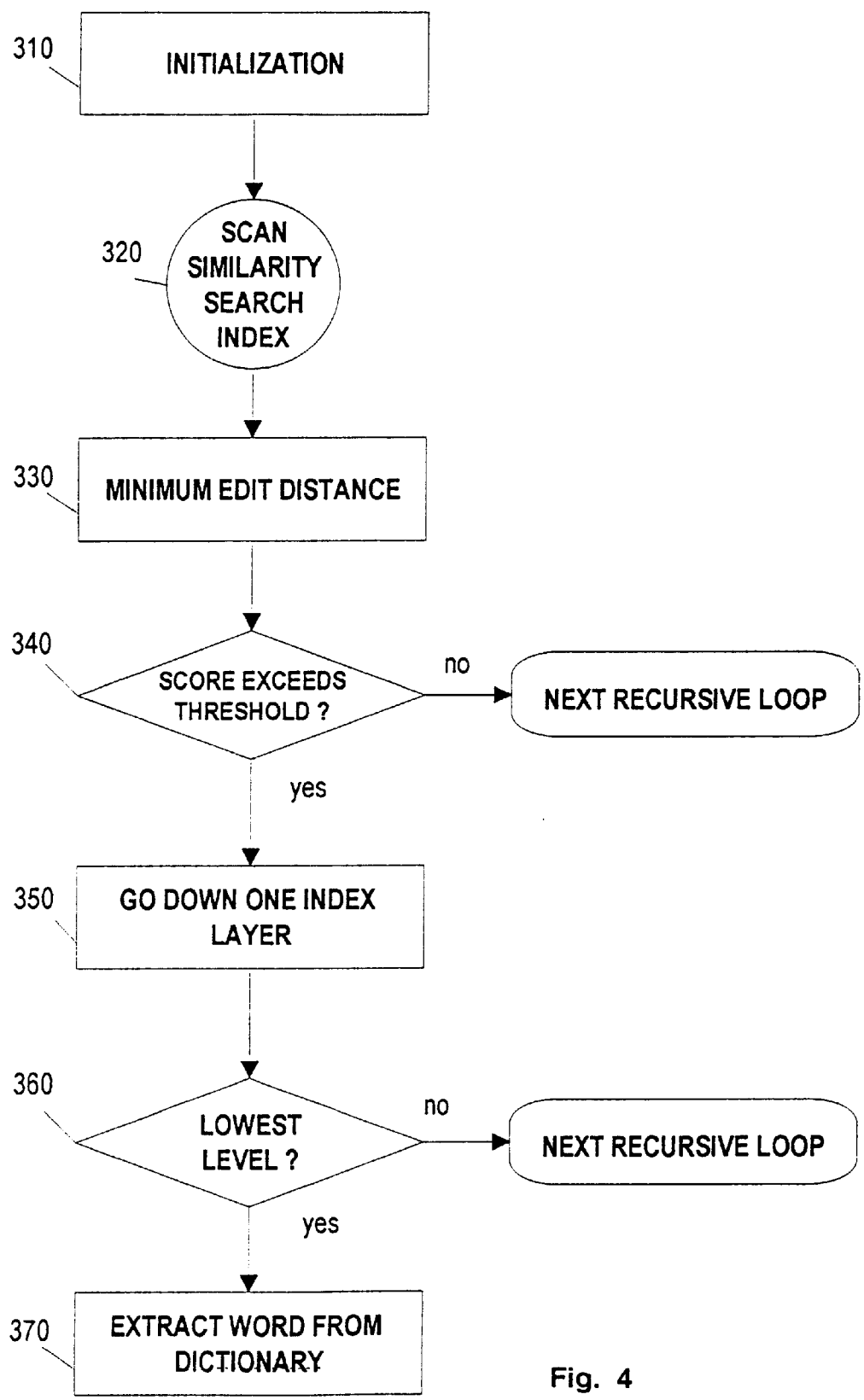
FIG. 4 is a flowchart illustrating a preferred method of operation for the dictionary lookup unit of FIG. 1.

Reference is now made to FIG. 4 which illustrates a preferred method of operation for dictionary lookup unit 50 of FIG. 1.

The input to the dictionary look up unit 50 are the strings that were guessed by spellguess unit 30, if the phonetic translator is omitted from the system of FIG. 1, or the strings that were generated by the phonetic translator unit 40. Dictionary look up unit 50 does not search for an exact match with the input strings, but rather performs a similarity search in order to find all dictionary words that are similar, to a predetermined extent, to the input strings, if not necessarily identical. Dictionary look up 50 uses a similarity threshold in order to define the predetermined extent of similarity.

The method of FIG. 4 preferably includes the following processes:

a. Initialization (process 310)—Determine the similarity threshold to be used. Microfiche Appendix C is a resource file in which one suitable similarity threshold is defined. The string for which it is desired to find similar dictionary words is translated into each of the reduced alphabets of the layers in the similarity search index. For example, if it is desired to find dictionary words which are similar to ADCINS using the similarity index illustrated in part in FIG. 13, ADCINS is translated into (6) in the layer 1 alphabet, (4,2) in the layer 2 alphabet, and (1,3,2) in the layer 3 alphabet.

b. Scan similarity search index (process 320). A similarity search index, the structure of which is described above with reference to FIG. 13, is scanned recursively, layer by layer, in order to find all dictionary words that are similar (better than or equal to the similarity threshold) to the input string arriving from spellguess 30 or translator 40.

Process 320 recursively invokes processes 330–370 in order to perform a depth-first search for similar nodes. The search employs a conventional distance-between-strings computation method to compute the distance between each node and the input string represented in the reduced alphabet of the layer to which the node belongs.

A suitable method for computing distance between strings is described in Hall, P. A. "Approximate string matching", Computing surveys, Vol. 12(4), pp. 381–402, 1980.

Parameters may be externally defined to determine the relative costs of symbol insertion and symbol deletion, for each symbol in the dictionary and reduced alphabets and for symbol substitution, for each pair of symbols in the dictionary and reduced alphabets. For example Microfiche Appendix B is a sample "cost scheduled" including cost for symbol insertion deletion and substitution.

It is appreciated that either a spoken language alphabet or a phonetic alphabet may be used as the dictionary alphabet.

The output of this step is a set of all dictionary words whose similarity to the "dictionary alphabet" representation of the input string is equal to or exceeds the similarity threshold defined in the initialization process 310.

Figure 5:
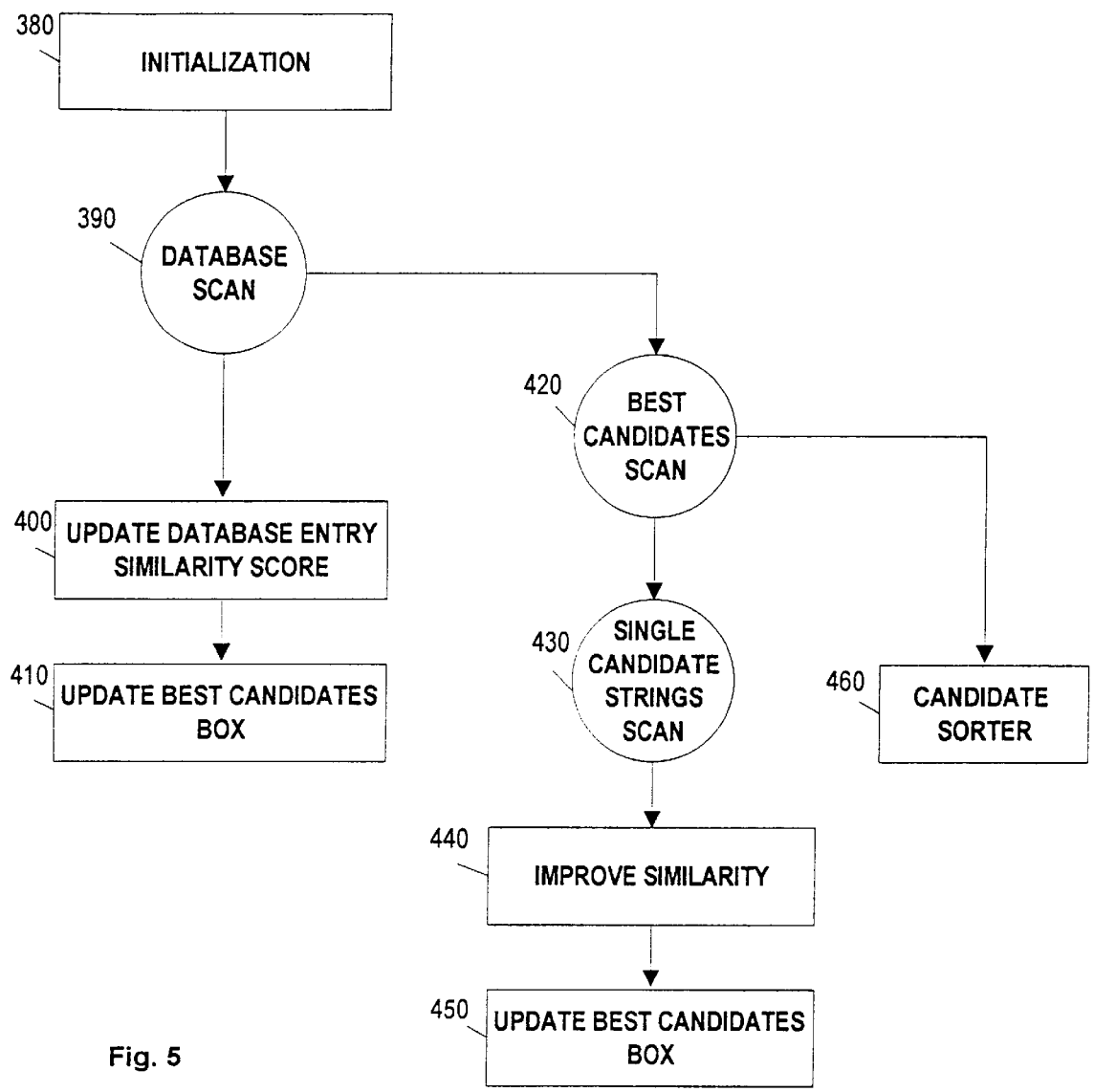
FIG. 5 is a flowchart illustrating a preferred method of operation for database lookup and candidate sorter units of FIG. 1.

Reference is now made to FIG. 5 which illustrates a preferred method of operation for the database lookup unit 90 and the candidate sorter unit 100 (FIG. 1). The database lookup unit 90 accepts as input each individual dictionary entry in the list of dictionary entries generated by dictionary lookup unit 50 along with its similarity score, also computed by dictionary lookup unit 50, and its entry context (last name, first name, etc.)

The database lookup unit 90 operates for each database entry component. For example, in zip code directory applications, the database lookup unit 90 operates after the state name is elicited from a user, then after the city's name is elicited and then after the street name is elicited. After each operation, the database lookup unit 90 updates the similarity vector 92 (FIG. 1) such that the similarity vector accumulates a similarity score for each database entry.

The output of the database lookup 90 and the candidate sorter 100 is a list of a predetermined number of database entries which are most similar to the words supplied by the user thus far, sorted according to their similarity scores. This list if stored in the best candidates box 94 of FIG. 1.

The method of FIG. 5 preferably includes the following processes:

a. Initialization (process 380)—Uses concordance 72 to find the logical and physical location of all database entries that include the requested dictionary entry value in the appropriate context. For example, if the user supplies SMITH as a last name, all subscribers whose last name is similar to Smith will be located.

If this is the first database look up in the database access session, initialization process 380 also clears the similarity vector 92 and the best candidates box 94.

b. Database scan (process 390)—Scans all the database entries that were selected by the initialization process 380. For each entry, the following 2 processes are performed:

i. Update database entry similarity score (process 400)—For each database entry, updates the similarity score by modifying the similarity score to reflect the degree of similarity of that database entry to the current word. For example, the word similarity score may be added to the appropriate similarity vector component.

ii. Update best candidates box (process 410)—Determines whether or not the previously updated database entry has to be included in the best candidates list, based on the following criteria:

if the database entry is already in the best candidates box, it is kept there with the new score updated if the best candidates box is not full, the database entry is added unconditionally if the best candidates box is full and the similarity score of the updated database entry is higher than the last (worst score) database entry in the candidates box, the last database entry is replaced with the new one.

At the end of processes 380 through 410, the similarity vector includes updated similarity scores and the contents of the best candidates box is determined. At this point, a candidate sorter 100 is invoked in order to resort the selected database entries in the best candidates box. The current ordering in the best candidates box is based on the sum of similarity scores of individual words where the similarity score of any word, if under a predetermined threshold, is considered to be zero. The candidates sorter computes the similarity of each zero-scoring word.

Specifically, the candidate sorter 100 preferably performs the following processes:

a. Best candidates scan (process 420)—Scans all the database entries in the best candidates box.

b. Single candidate words scan (process 430)—Scans all the words of a single database entry in the best candidates box. This process decides whether the similarity score of any one of the database entry strings may be improved, according to the following criteria:

the word was supplied by the caller; and the word's similarity score is 0.

For each of the words fulfilling this criteria, the process invokes 2 additional processes (improve similarity 440, and update best candidates 450), in order to refine the similarity scores, first at the word level and then at the database entry level.

c. Improve similarity scores (process 440)—Reinitiates a minimum edit distance similarity check, similar to process 330 in FIG. 4, between a current database entry word in the best candidates box 94 and each word previously guessed by the spellguess unit 30, using a lower threshold measure than that originally employed by process 330. If the resulting similarity score differs from 0, the word similarity score and the database entry similarity score are both updated in process 450.

d. Update best candidates box (process 450)—Compute the total similarity score of each changed database entry in the best candidates box and the similarity vector.

e. Candidate sorter (process 460)—Sorts the entire best candidates box according to the similarity score, using a suitable conventional sort mechanism, such as a heap.

The output of the entire database lookup 90 and candidate sorter 100 is a list of all best candidates database entries, sorted according to their similarity scores.

Figure 6:
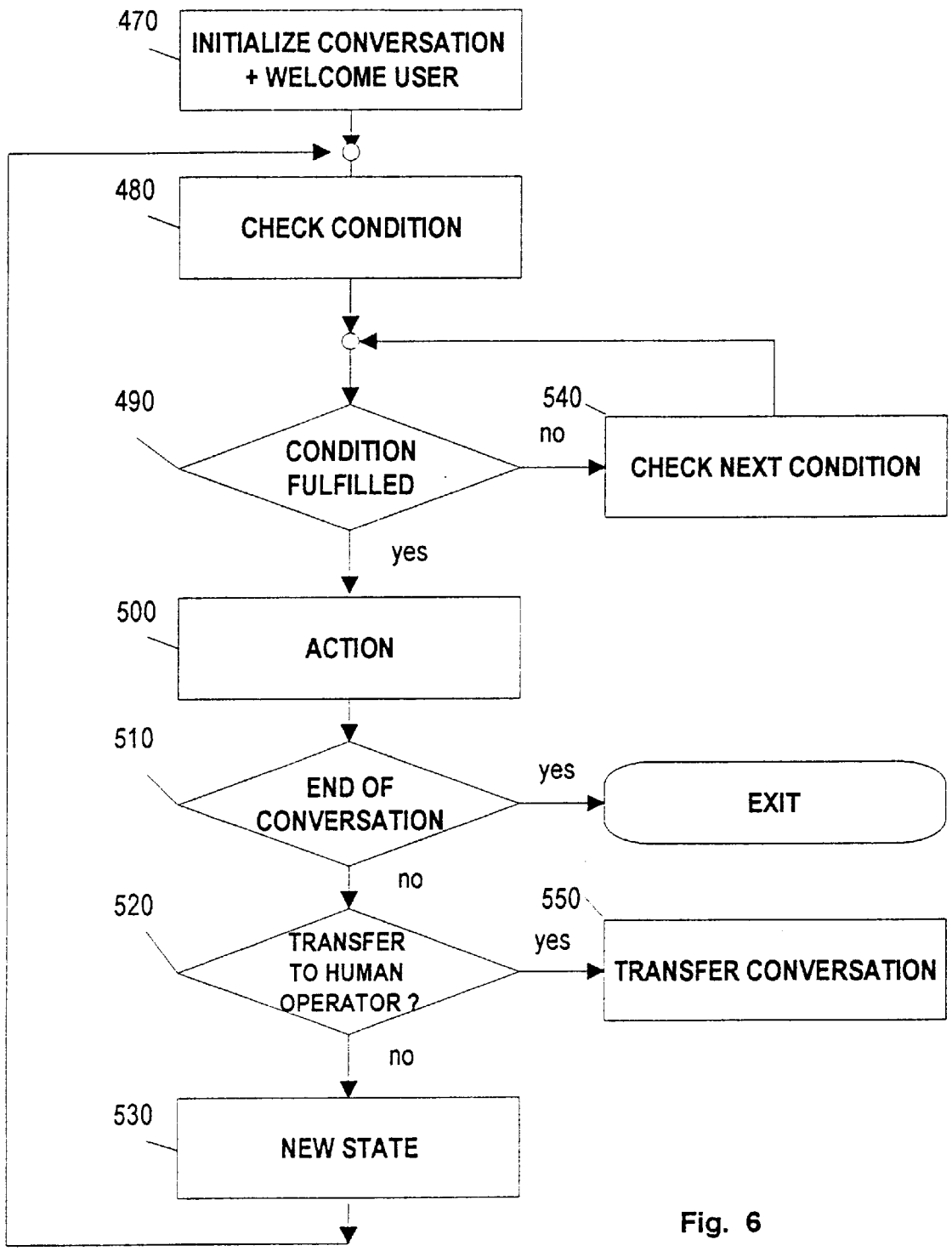
FIG. 6 is a flowchart illustrating a preferred method of operation for the conversation manager of FIG. 1.

Reference is now made to FIG. 6 which illustrates a preferred method of operation for the conversation manager 80. The conversation manager controls the conversation between the caller and the system, from the moment the caller gains access to the computer and until the conversation is finished. The actions taken by the conversation manager, including message providing action, depend on the contents of the best candidates box 94.

The conversation manager 80 is preferably implemented as a state machine whose logic is defined by a decision table. A sample decision table, which is internal to the system, is provided in Microfiche Appendix D. However, the decision table is preferably completely external to the system to enable it to be easily modified.

The conversation manager 80 includes three building blocks: the state, the condition and the action. The conversation begins at the initial state, and each additional item of information acquired, leads the conversation to a different state. At each state, the conversation manager checks for the first condition that is fulfilled, and performs the action that is associated with the state and the condition. After that, the conversation manager proceeds to the next state. For example, one state may be "beginning of conversation", a condition may be "was a word entered by caller?", and an action may be "propose a selection list", or "search the database".

The method of FIG. 6 preferably includes the following processes:

a. Initialize conversation +welcome user (process 470)— Set the conversation to the initial state, and, typically, provide a welcome message, which includes the instructions for using the database access system.

b. Check condition (processes 480, 490 and 540)—Check whether the condition associated with the state is fulfilled or not. At least one condition has to be fulfilled per state, so the conversation manager loops until it finds the first one.

c. Action (process 500)—Perform the action that is associated with the state and with the first condition that is fulfilled.

d. End of conversation (process 510)—If the system enters the "end of the conversation" state, the conversation is ended.

e. Transfer to operator (processes 520 and 550)—If the conversation manager comes to the conclusion that the conversation has to be transferred to a human operator, it generates the appropriate routing instructions. This action may be useful, if for example, the conversation is too long, or the information provided by the caller does not identify a specific piece of information, or if the caller requests to be transferred to a human operator.

f. New state (process 530)—The conversation manager proceeds to a new state, once it has finished handling the actions of previous state.

Figure 9:
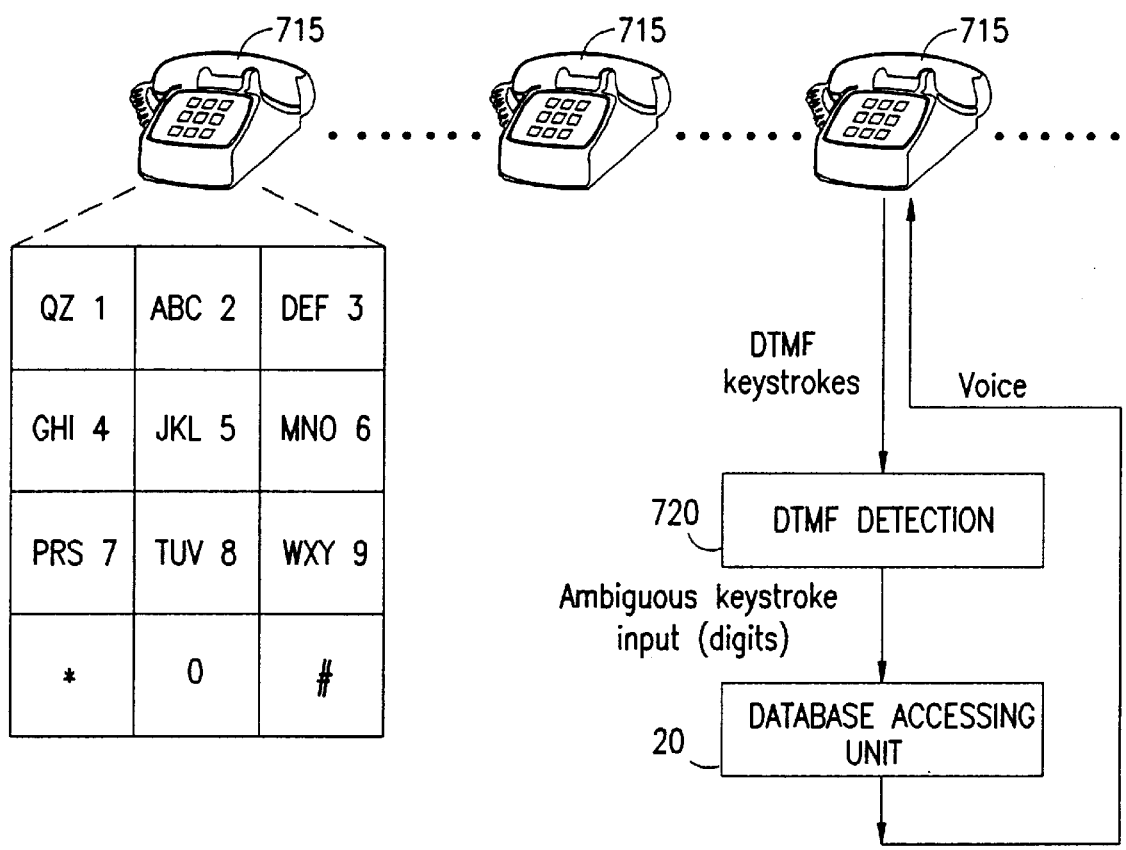
FIG. 9 is a simplified block diagram of one implementation of the apparatus of FIG. 1 in which the ambiguous input comprises telephone keypad input.

Reference is now made to FIG. 9 which is a simplified block diagram of one embodiment of the apparatus of FIG. 1 in which the ambiguous input comprises telephone keypad input. In the embodiment of FIG. 9, the ambiguous input generator 10 of FIG. 1 includes a plurality of conventional telephone instruments 715 communicating via a telephone network with database accessing unit 20 via a conventional DTMF (dual tone multiple frequency) detection module 720 which is operative to convert the keystroke information into conventional digital data signals such as ASCII data signals.

In the embodiment of FIG. 9, the ambiguous input is keystroke information wherein each key corresponds to more than one letter of the English alphabet and may also correspond to the digit corresponding to the key. The data is ambiguous because every letter is entered by a single stroke on one of the telephone keypad buttons, and every button represents up to 3 different letters. For example, button 2 represents either A or B or C, while button 3 represents either D or E or F. For example, the sequence of digits "2"; "3" could represent any of the following letter combinations: AD, AE, AF, BD, BE, BF, CD, CE, CF, as well as combinations of letters and the numbers "2" and "3". So, a string of length n can be interpreted in 3 to the power of n different ways. For example, a sequence of 6 keystrokes corresponds to 729 alternative words. For example, the names ARNOLD and BROOKE are keyed with the same keystroke sequence (276653). The same is true with names like BREEN and ARDEN (27336), or BUSH and BURG (2874).

Reference is now made to FIG. 10 which is another embodiment of the apparatus of FIG. 9 in which the ambiguous input is ambiguous oral character input rather than ambiguous keystroke input. In the embodiment of FIG. 10, the ambiguous input generator 10 of FIG. 1 comprises a plurality of telephone instruments 740 or other speech input devices providing ambiguous speech input to the database accessing unit 20 via a probabilistic spoken character recognition device 750.

The probabilistic spoken character recognition device 750 is similar to conventional speech recognition units, except that the output is probabilistic. In other words, the final decision stage in which probabilistic input, as to the contents of the speech, is reduced to a single possibility, typically by selecting the most probable speech content, is omitted.

A design suitable for a probabilistic spoken character recognition device is described in Rabiner L., Juang B., *Fundamentals of Speech Recognition*, Prentice-Hall, 1993, pp. 43–52.

In this embodiment, the user is prompted to provide oral input by spelling the desired words. For example, the conversation manager may prompt the user to "SPELL THE STREET NAME YOU ARE LOOKING FOR."

The input provided by device 750 is ambiguous since the probabilistic spoken character recognition box 750 outputs several possible characters, along with their relative probabilities, for every input spoken character. For example, a user's attempt to utter a "D", may be interpreted by the probabilistic spoken character recognition box 750, as "B" with probability 0.5, "D" with probability 0.3, and "T" with probability 0.2. A subsequent utterance of the letter "D", may yield different output (letters and probabilities).

Reference is now made to FIG. 11 which is another embodiment of the apparatus of FIG. 1 in which the ambiguous input comprises ambiguous spoken phoneme input rather than ambiguous oral character input.

In the embodiment of FIG. 11, the ambiguous input generator 10 comprises a plurality of telephone instruments 760 or other speech input devices, and a probabilistic spoken phoneme recognition box 770. In this embodiment, the user is assumed to provide speech input in the form of spoken words. For example, the conversation manager may prompt the user to "STATE THE STREET NAME YOU ARE LOOKING FOR."

The probabilistic spoken phoneme recognition device 770 is similar to conventional speech recognition units, except that the output is phonemes with associated probabilities. In other words, the final decision stage in which probabilistic input, as to the contents of the speech, is reduced to a single possibility, typically by selecting the most probable speech content, is omitted. A suitable design for a probabilistic spoken phoneme recognition device is described in Rabiner L., Juang B., *Fundamentals of Speech Recognition*, Prentice-Hall, 1993, pp. 43–52.

For example, the word "DAVE" may be phonetically broken into the following phonemes: D, Ey and V (when using a certain phonetic alphabet).

When the word "DAVE" is input to a probabilistic spoken phoneme recognition box 770, it may recognize every phoneme in several ways, with a certain probability applied to every phoneme. For instance, the first phoneme may be expressed as "(D, 0.4), or (B, 0.4), or (T, 0.2)"; the second phoneme may be expressed as "(Ey, 0.6) or (Eh, 0.3), or (Ay, 0.1)"; and the third phoneme may be expressed as "(V, 0.8), or (B, 0.1), or (F, 0.1)".

Microfiche Appendix A is a computer listing of a preferred software implementation Jr a telephone directory database access system which utilizes an "alphabet definition" file, a "resource" file, a "conversation manager decision table" file, an "error messages" file, and a "phonetic translation rules" file.

Microfiche Appendix B is an example of an alphabet definition file.

Microfiche Appendix C is an example of a "resource" file.

Microfiche Appendix D is an example of a "conversation manager decision table" file.

Microfiche Appendix E is an example of an "error messages" file.

Microfiche Appendix F is an example of a "phonetic translation rules" file.

The terms "resource" file, "conversation manager decision table" file, "error messages" file, and "phonetic translation rules" file are now explained in detail.

The Alphabet Definition file contains a definition of the various alphabets used in the system, and the translation rules between the various alphabets. A description of an example of an alphabet definition file, appended hereto and referenced Appendix B, is as follows:

The title "ALPHABETS" designates the beginning of the alphabet definition section. This section contains the following fields:

I. Name—The alphabet name. Note that-the alphabets named "clusterX" are reduced alphabets.
II. Type—The alphabet type. The permitted types are:
   1. String—regular alphabet.
   2. Normal—regular alphabet, but all the letters are kept normalized—i.e., instead of using the regular ASCII values to represent the alphabet letters, they are represented as consecutive numeric values starting from 1.
   3. Vector—an alphabet that is kept in vector form. A word in this A form comprises a vector, whose size is equal to the alphabet size. The i'th entry in the vector contains the number of occurrences of the respective letter in the word.
III. abSize—size of the alphabet.
IV. Attribute—Information regarding the correct interpretation of the "value" field (field V). The permitted attributes are:
   1. Letters—The "value" field contains the list of letters in the alphabet.
   2. Cost—the "value" field contains the insertion cost, deletion cost and substitution cost, in that order, of the alphabet.
   3. Inscost—the "value" field contains only the insertion cost of the alphabet.
   4. Delcost—the "value" field contains only the deletion cost of the alphabet.
   5. SubsX—the "value" field contains the costs of substituting each of the symbols of the alphabet for a symbol X in the alphabet which exists in a particular word. X may be represented by one or more characters. For phonetic alphabets, X is often represented by two characters.
V. Value field.

The title "TRANSLATION" in Microfiche Appendix E designates the beginning of the Translation section. This section contains the following fields:

I. From—the name of the source alphabet.
II. To—the name of the target alphabet.
III. From letters—letters from the source alphabet which are to be translated into the target alphabet.
IV. To letters—the corresponding letters in the target alphabet.

Translations in which, generally speaking, one or more symbols in the source alphabet are translated into a unique symbol in the target alphabet appear in Microfiche Appendix B, However, the translation from a grapheme alphabet to a phonetic alphabet is not defined here but rather in the "phonetic translation rules" file, an example of which is appended hereto and is referenced in Microfiche Appendix F.

The term "Resource File" is now defined. An example of a resource file is appended hereto and is referenced as Appendix C.

The resource file is a key translating logical names used by the system, such as file names, into actual values. Typically, the system recognizes only logical names for each file and each logical name is translated into a specific disk file with the help of the resource file. The resource file is also used for message texts, special run-time thresholds and switches.

Each line of the resource file contains three fields: logical name, actual value and remarks. The logical name may not contain blanks. If an actual value contains blanks, the actual value is truncated at the first blank. If blanks are to be inserted within the actual value, the actual value should be enclosed in apostrophes. In this case the actual value may span more than one line, provided that each line contains apostrophes at the beginning and end of the line.

The file may contain the #include directive, whose meaning is similar to that of the #include directive in the "C" programming language. This directive allows the inclusion of another resource file into the current resource file. Resource files may be nested in that manner to any desired nesting level.

In case the same logical name appears more than once, only the first occurrence is used. Thus it is possible to create a standard #include file that will contain default parameters. Those parameters can be overridden if the logical name appears before the #include of the standard file. The logical names of the resource file are case-insensitive. The resource file is loaded into memory by the loadResourceTable routine. The translation from logical name to actual value is performed by the member function "allocate" which belongs to class "ResourceBox", or by the member function "ValueOf", also belonging to the "ResourceBox" class.

The term "Conversation Manager Decision Table" is now described. An example of a "conversation manager decision table" is appended herein and is referenced Microfiche Appendix D. The conversation manager 80 of FIG. 1 is driven by a central decision table, which contains States, Conditions and Actions.

The decision table contains one or more "Header" lines. Each Header line contains titles of all fields in the decision table. The first field is termed the "line label" field, the second field is termed the "state" field, and the rest of the fields are conditions (denoted by C in the title line) and actions (denoted by A in the title line).

The "line label", designated in the first field, is a unique identification of each line in the file. It is used in order to keep the "session history"—a log of the actions that were taken in the current session.

The conversation manager 80 of FIG. 1 scans the Decision Table line by line, and for each line checks if all the conditions in that line are met (i.e., have the required value), until a line is found which satisfies all the conditions. The actions of this conditions-satisfying line are performed in the order in which they appear in that line.

The Decision Table is compiled into a C++ source code by the routine "createDecisionTB". This is the source code of the "decide" member function which belongs to the "ConvManager" class.

The term "Error Messages" file refers to a file in which all possible error messages are stored. An example of an "error messages" file is appended hereto and is referenced Microfiche Appendix E.

Microfiche Appendix contains a set of error messages that are displayed and written to the log file (error.log) in case an error occurs during the system execution. Each message is identified by a message name (up to 18 characters long), a severity code and message text. The permitted severity codes are: F for fatal, E for error, W for warning, and I for informational. A fatal error causes the system to abort. All other message types allow the system's execution to proceed.

Each error message may contain up to three parameters, which are enclosed in brackets, e.g. <file name>. Each parameter is replaced by an actual value when the error message is invoked. The "error" routine accepts the actual values and inserts them into the error message. Then it displays the error message on the screen, and writes it to the log file. For fatal errors—it aborts the system.

The "Phonetic Translation Rules" file contains all phonetic translation rules employed by phonetic translator 40 of FIG. 1 to translate grapheme words into a phonetic representation. An example of a "phonetic translation rules" file is appended hereto and is referenced Microfiche Appendix F.

The syntax for Phonetic Rules employed in Microfiche Appendix F is given below in BNF format. BNF is a conventional scheme for representing formal languages.

```
<rule>::= <grapheme string> -> <phoneme string> |
   <grapheme string> -> <phoneme string>/<preceding substring> |
   <grapheme string> -> <phoneme string>/_<following substring> |
   <grapheme string> -> <phoneme string>/<preceding substring>_<following substring>
<preceding substring>   ::= <grapheme sequence>
<following substring>   ::= <grapheme sequence>
   <grapheme sequence>  ::= <grapheme letter> |
                <grapheme sequence><grapheme letter>
<grapheme letter> ::= <grapheme character> | !<grapheme character>
<grapheme character> ::= grapheme | . | V | C | [<grapheme string>]
<grapheme string> ::=  grapheme | <grapheme string> grapheme
<phoneme string>  ::=  phoneme | <phoneme string> phoneme
```

A grapheme is a symbol in the grapheme alphabet as defined in the alphabet definition file. A phoneme is a symbol in the phoneme alphabet, as defined in the alphabet definition file. The dot (.) represents a "don't care" symbol, and can stand for any grapheme symbol.

The lower-case v symbol stands for any vowel. The lower-case c symbol stands for any consonant. The square brackets enclose a list of alternative grapheme symbols. For example, the rule: G→Jh/_[EI] means: grapheme G is translated to phoneme Jh if it followed by either E or I.

A preferred method for generating a telephone directory database access system based on the listings of Microfiche Appendix A is as follows:

a. Provide the following hardware environment: fully compatible IBM PC 386 or higher, Sound Blaster audio card.
b. Provide the following software environment: MS-Windows 3.1, Monologue for Windows Text-to-Speech synthesizer from Creative Labs, Borland C++3.1 & Application Framework for Windows.
c. Appendix A is written in C++, and contains classes as well as the source code itself. Compile and link the code of Appendix A, thereby to create a single executable image.
d. Provide the following input files which are required to operate the system:
   1. Database—according to the format described in class ListingRecord.
   2. Dictionary—according to the format described in class NameDictionary.
   3. Alphabet definition—description of the alphabets used, and the various costs for spelling mistakes. An example of an alphabet definition file is Microfiche Appendix B.
   4. Resource file—description of all files and parameters needed to run the system. An example of a resource file is Microfiche Appendix C.
   5. Conversation manager decision table—description of the conversation flow. An example of a conversation manager decision table file is Microfiche Appendix B.
   6. Errors—the textual description of possible system errors. An example of an errors file is Microfiche Appendix E.
   7. Phonetic translation rules—description of the phonetic rules. An example of a phonetic translation rules file is Microfiche Appendix F.
e. Run the executable image generated in step c.

In the illustrated embodiment, the following output files are created during system operation:
   1. Error log—description of errors encountered during execution.
   2. Log—information and statistics on a single use of the system.
   3. Session—recording of the conversion handled in a single use of the system.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

In the present specification and claims, the term "probabilistic string" refers to a sequence S over an alphabet A (such as the English alphabet, any non-English alphabet, the phonetic alphabet or any other set of characters) of n elements where each element $S_i$ is a finite non-empty set of (character, probability) pairs.

The term "keypad" refers to an input device including a plurality of input buttons or keys each of which, separately or in combination with other input buttons or keys, represents one or more characters. For example, each key on a conventional telephone keypad represents three, two or only one characters.

The term "erroneous user input" refers to a database accessing request provided by a user which comprises an inaccurate production of a word in the database. The inaccuracy may comprise one, some or all of the following types of inaccuracy: spelling inaccuracy, pronunciation inaccuracy or factual inaccuracy.

The term "spelling inaccuracy" refers to a cognitive or typographical error which results in an incorrect spelling of a database word. For example, a user wishing to access a street name BROADWAY may key in or spell out BROAWDAY or DROADWAY. A user wishing to access a locality PHILADELPHIA may key in or spell out FILADELFIA.

The term "pronunciation inaccuracy" refers to an incorrect oral rendition of a database word. For example, a user wishing to access the name MARIE may state this request as "MARY".

The term "factual inaccuracy" refers to provision of incorrect information. For example, a user wishing to access JOHN REMINGTON may request JACK REMINGTON.

It is appreciated that the user accessing the system shown and described herein can be either a human user or a computerized system.

It is appreciated that the ambiguous input may, alternatively, comprise the output of an OCR (optical character recognition) device such as a handwriting recognition device.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

The invention claimed is:

1. A database accessing system for processing a database query, the database including a multiplicity of entries each of which comprises at least first and second words, the database query including a sequence of at least first and second inputs corresponding to said first and second words respectively, each input including a plurality of input elements, the system including:

a dictionary of all words in said database, including, for each word, a spelled representation of the word and a phonetic representation of the word;

an input element interpreter operative to convert each of said at least first and second inputs into a representation of a plurality of strings of symbol-probability pairs, each symbol-probability pair including a symbol which is a possible interpretation of an individual input element and an estimated probability of said input element having said possible interpretation;

a trigram stochastic evaluator operative to select high-probability strings from among said plurality of strings in said graph based at least partly on the frequency with which trigrams of symbols within said strings appear in said database;

a dictionary searcher operative, for each individual high-probability string, to search said dictionary for words whose phonetic representation is similar, relative to a predetermined similarity threshold, to a phonetic representation of said individual high-probability string and to assign to each found word a similarity value quantifying the degree to which the found word phonetically resembles the individual high-probability string; and an entry similarity evaluator operative to identify a subset of entries in the database, based on output from said dictionary searcher, and, for each individual entry in said subset, to evaluate the similarity of said entry as a whole to said database query by combining the similarity values representing similarity of the words within said individual entry to the corresponding inputs within said database query.

2. A system according to claim 1 wherein the similarity value assigned to an individual word depends only on the absolute degree of resemblance of the individual word to said input and does not depend on the relative degree to which the individual word resembles said input, in relation to the degrees to which other words in the dictionary resemble said input.

3. A system according to claim 1 wherein the words found by the dictionary searcher comprise all words which exceed a predetermined word-level resemblance threshold rather than comprising a predetermined number of best words.

4. A system according to claim 1 wherein at least one of said inputs comprises a spoken word and at least one of said input elements comprises a phoneme.

5. A system according to claim 1 wherein at least one of said inputs comprises an orally spelled word and at least one of said input elements comprises an orally spoken letter.

6. A system according to claim 1 wherein at least one of said inputs comprises a sequence of keystrokes and at least one of said input elements comprises a keystroke.

7. A system according to claim 1 wherein said representation comprises a a probabilistic string including a sequence S over an alphabet A of n elements where each element $S_i$ (i=1, . . . , n) in sequence S is a finite, nonempty set of (symbol, probability) pairs.

8. A system according to claim 1 and also comprising a phonetic translator operative to generate a phonetic representation of each said high-probability string.

9. A system according to claim 1 wherein said entry similarity evaluator is operative to compute the similarity between at least one similar/non-similar entry and said query, wherein said similar/non-similar entry includes a first word whose similarity relative to the query's first word falls above the predetermined similarity threshold and a second word whose similarity relative to the query's first word falls below the predetermined similarity threshold.

10. A system according to claim 1 and also comprising a dictionary arranger operative to arrange said dictionary as a hierarchy of clusters, each cluster including words with an identical reduced alphabet, and wherein said dictionary searcher is operative to traverse the dictionary hierarchically.

11. A system according to claim 1 wherein said database comprises a telephone directory.

12. A system according to claim 1 wherein at least one of said inputs comprises a spoken word and at least one of said input elements comprises a phoneme.

13. A system according to claim 1 wherein at least one of said inputs comprises an orally spelled word and at least one of said input elements comprises a orally spoken letter.

14. A system according to claim 1 wherein at least one of said inputs comprises a sequence of keystrokes and at least one of said input elements comprises a keystroke.

15. A system according to claim 1 wherein the entry similarity evaluator is operative to combine said similarity scores into a combined value and to select entries having highest combined value.

16. A system according to claim 1 wherein the entry similarity evaluator is operative to decide whether a database entry does or does not correspond to a database query based on the similarity values of all inputs in the query.

* * * * *